United States Patent
Ferlitsch

(10) Patent No.: US 7,365,870 B2
(45) Date of Patent: Apr. 29, 2008

(54) METHODS AND SYSTEMS FOR PAGE-INDEPENDENT SPOOL FILE FACE-UP EMULATION

(75) Inventor: Andrew Rodney Ferlitsch, Tigard, OR (US)

(73) Assignee: Sharp Laboratories of America, Inc, Camas, WA (US)

(*) Notice: Subject to any disclaimer, the term of this patent is extended or adjusted under 35 U.S.C. 154(b) by 1056 days.

(21) Appl. No.: 09/932,661

(22) Filed: Aug. 17, 2001

(65) Prior Publication Data

US 2003/0038964 A1    Feb. 27, 2003

(51) Int. Cl.
G06F 15/00    (2006.01)
G06F 15/173   (2006.01)

(52) U.S. Cl. .................... 358/1.15; 358/1.13

(58) Field of Classification Search ........... 358/1.13, 358/1.15; 715/500; 271/291, 186; 270/1.01, 270/32
See application file for complete search history.

(56) References Cited

U.S. PATENT DOCUMENTS

| | | | |
|---|---|---|---|
| 5,241,397 A | 8/1993 | Yamada | 358/296 |
| 5,287,194 A | 2/1994 | Lobiondo | 358/296 |
| 5,528,734 A | 6/1996 | Sanchez | 395/115 |
| 5,845,058 A | 12/1998 | Shaw et al. | 395/114 |
| 5,859,711 A | 1/1999 | Barry et al. | 358/296 |
| 5,897,260 A | 4/1999 | Zingher | 400/719 |
| 5,978,650 A | 11/1999 | Fischer et al. | 455/3.1 |
| 5,982,996 A | 11/1999 | Snyders | 395/114 |
| 5,995,721 A | 11/1999 | Rourke et al. | 395/114 |
| 5,995,723 A | 11/1999 | Sperry et al. | 395/114 |
| 6,057,930 A * | 5/2000 | Blossey et al. | 358/1.15 |
| 6,088,120 A | 7/2000 | Shibusawa et al. | 358/1.15 |
| 6,157,465 A | 12/2000 | Suda et al. | 358/407 |
| 6,229,622 B1 | 5/2001 | Takeda | 358/1.16 |
| 6,248,996 B1 | 6/2001 | Johnson et al. | 250/234 |
| RE37,258 E | 7/2001 | Patel et al. | 358/1.15 |
| 6,266,150 B1 | 7/2001 | Brossman et al. | 358/1.15 |
| 6,337,745 B1 | 1/2002 | Aiello, Jr. et al. | 358/1.15 |
| 6,825,943 B1 * | 11/2004 | Barry et al. | 358/1.15 |
| 2001/0038462 A1 | 11/2001 | Teeuwen et al. | 358/1.15 |
| 2002/0027673 A1 | 3/2002 | Roosen et al. | |
| 2002/0042798 A1 | 4/2002 | Takei et al. | |

FOREIGN PATENT DOCUMENTS

| | | |
|---|---|---|
| JP | 64-014043 | 1/1989 |
| JP | 04-199218 | 7/1992 |
| JP | 05-270064 | 10/1993 |

(Continued)

OTHER PUBLICATIONS

PostScript Language Document Structuring Conventions Specification, Version 3.0, Adobe Systems Incorporated, 1992.*

*Primary Examiner*—Gabriel Garcia
(74) *Attorney, Agent, or Firm*—Krieger Intellectual Property; Scott C. Krieger

(57) ABSTRACT

Embodiments of the present invention comprise driver-independent, printer-independent systems and methods for providing collated, face-up printer output. These embodiments may utilize a page-independent spool index file that may be manipulated to produce collated, face-up printer output that may not be available through a system's hardware or drivers.

12 Claims, 16 Drawing Sheets

FOREIGN PATENT DOCUMENTS

| | | |
|---|---|---|
| JP | 06-004239 | 1/1994 |
| JP | 08-101754 | 4/1996 |
| JP | 09-030040 | 2/1997 |
| JP | 09-319530 | 12/1997 |
| JP | 10-031750 | 2/1998 |
| JP | 10-187393 | 7/1998 |
| JP | 10-207643 | 8/1998 |
| JP | 10-283130 | 10/1998 |
| JP | 10-340166 | 12/1998 |
| JP | 10-340167 | 12/1998 |
| JP | 10-027149 | 1/1999 |
| JP | 11-015608 | 1/1999 |
| JP | 11-024860 | 1/1999 |
| JP | 11-143661 | 5/1999 |
| JP | 2000-099303 | 4/2000 |
| JP | 2000-132347 | 5/2000 |
| JP | 2000-151873 | 5/2000 |
| JP | 2001-088405 | 4/2001 |

\* cited by examiner

METHODS AND SYSTEMS FOR PAGE-INDEPENDENT SPOOL FILE FACE-UP EMULATION

BACKGROUND

Traditionally, collated, face-up printing has been performed through the use of print drivers or printer firmware/hardware. Special print drivers may be used to implement custom printing features, however print drivers are printer specific. Each printer or group of closely-related printers must have its own driver, therefore, implementing special features across a variety of printing devices requires the customization of a multitude of print drivers. Implementation of a new feature across the thousands of available printers today and new printers as they are introduced can be an endless task.

Furthermore, many of the algorithms used for these processes require the last page of a document to be rendered before the sheets are printed. This requires storage of the rendered data on the host computer until the entire print job is rendered. When compared to immediate despooling of the page data to the printer, these processes can be slow and require expensive hardware and firmware or additional software.

Some advanced printers, containing a microcomputer processor and disk (firmware), and additional mechanical components (rollers) can accomplish collated, face-up printing within the printer itself, alleviating the need of the print driver support and storage on the host computer.

What is needed is a simple, cost-effective method of achieving collated, face-up printing without the added complexity, expense and delay of current implementations.

Many computing device platforms and printing systems are available today and embodiments of the present invention may be implemented with many of these systems, however, due to the prevalence of the Microsoft Windows® operating system family, embodiments used in conjunction with Windows® systems will be used to illustrate its functions. Accordingly, details of Microsoft Windows 95® and related Microsoft Windows® printing processes will be explained.

Microsoft Windows® operating systems typically employ two file types in the printing process. These file types are Enhanced Metafile (EMF) and raw format (raw) files.

Raw format files are device dependent files which are destined and formatted for a specific device. An example of a raw file is an encapsulated Postscript file, which is formatted to be interpreted by a Postscript printer. EMF files are device independent which contain graphic device interface (GDI) function calls that reproduce an application's graphic objects on a printer. EMF files are used to quickly record a printed document and return system control to a user. After control is returned to the user, the function calls stored in the EMF file may be executed and sent to the printer in the background.

Files may be recorded for later play back by using a spool file that is written and later despooled to a printing device. Spool files may be used for EMF and raw files. However, a print job may also be written directly to a printing device without using a spool file. Some typical printing process scenarios using raw spool files and EMF spool files are described below to introduce the elements and relationships of these processes and how they relate to embodiments of the present invention. These scenarios are derived from information contained in the Microsoft Windows 95® Driver Development Kit (DDK) documentation, the Microsoft Windows 2000® DDK documentation and the Microsoft Windows NT® DDK documentation.

A typical printing process scenario using a raw spool file may be described in reference to FIG. 1 wherein an application 10 initiates a print request 1 by calling a graphic device interface (GDI) 12. Application 10 may be a word processor, spreadsheet, browser, database program or some other program that runs on the underlying operating system. Typically, application 10 will create a device context (DC) and draw an object (i.e., a circle, a line, etc.) to the DC. The application 10 will then call the GDI with a print request directed to a particular printer 16 (FIG. 2) using that DC.

The GDI 12 will call the printer driver 14 associated with the particular printer 16 and request 2 instructions on how to render the object on that particular printer 16. The printer driver 14 will return 3 the instructions on how to render the object on the printer 16. In Windows 95®, used in this printing process example, the printer driver 14 is written in 16-bit code and communicates with a 16-bit GDI 12. This GDI will then pass the print request to a 32-bit GDI (GDI32) 18 to handle the 32-bit Windows 95® spooler process. GDI32 makes an interprocess call 5 to the spooler process 20.

Spooler process 20 calls 6 the router 22 to route the print job to printer 16. In this example, illustrated in FIGS. 1-2, the router 22 sends the print job to a local print provider 24. In other scenarios, the router 22 may send print jobs to a network printer through a network print provider (not shown). When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also. Print jobs to locally connected printers or locally queued to (e.g., LPR) to network printers are handled similarly to Windows 95, 98 local print jobs.

In this local printing scenario, the router 22 calls the local print provider 24 with the print job. Local print provider 24 writes or "spools" 8 a raw spool file 26 to disk for later access. This is done to avoid waiting for the printer to complete the job before control is returned to the application. These steps from initiating the print request 1 to writing to spool file 26 may be repeated many times. Data may be appended to spool file 26 until an application signals that the print job is complete. This may be signalled with an EndDoc function. Local print provider 24 also starts 9 a background thread 28 that will determine the best time to start playing back or "despooling" the spool file 26 to the printer 16.

In reference to FIG. 2, Thread 28 monitors spooler subsystem resources to determine a good time to playback spool file 26. When thread 28 determines that playback should commence, a StartDoc function call 17 is sent to print processor 32 to start a new print processor thread 11. Print processor thread 11 invokes the local print provider 24 with a ReadPrinter function call to read part of the spool file 26. A print processor thread 12 also uses the local print provider 24 to invoke the language monitor 34 with a WritePrinter function call to send data through the physical port 38 connected with the bidirectional printer 16 specified previously.

For raw spool files, the default print processor 32 simply passes data through without changing or interpreting any of the information. A language monitor 34 is used in this example because the destination printer 16 is a bidirectional printer. When non-bidirectional printers are used a port monitor 36 would be invoked instead of the language monitor 34. A language monitor 34 and port monotor 36 may be separate components or may be integrated into one monitor.

Language monitor 34 calls 13 a port monitor 36 to send print job data to the printer 16. The port monitor 36 then sends 15 the raw data through the physical port 38 to the printer 16. This process of reading from a spool file 26 and forwarding data to the printer 16 may be repeated several times to complete a print job. This is typically repeated until an end-of-file is reached or the job is cancelled. The playback thread 12 is terminated at that point. The combination of spooler process, router, local print provider, print processor, language monitor and port monitor may be referred to collectively as a "spooler" 30.

When Windows Enhanced Metafile (EMF) format files are used in the printing process of Windows 9.x systems, process components interact differently than with raw files. An example printing process, shown in FIGS. 3 and 4 illustrates the printing process using EMF files.

This process typically commences when an application 40 creates a printer DC and draws an object to the DC (not shown). The application 40 then calls 41 GDI 50 with an EMF spooling request for a designated printer 68. GDI 50 queries 42 the printer driver 52 associated with the designated printer 68 to determine whether the driver 52 supports EMF spooling. If the driver 52 supports EMF spooling, GDI 50 changes the printer DC to an EMF DC and writes 43 the instructions for rendering the object to the EMF DC 54 (creates EMF files). GDI 50 then passes 44 the print request to the 32-bit GDI (GDI32) 56 because, in this example the Windows 95® spooler process is 32-bit code. GDI 32 subsequently makes an interprocess call 45 to the spooler subsystem 70 with a description of the print job.

The spooler process 58 (SPOOL32.EXE), in the spooler system 70, calls the router 60 to pass the print job description to the print provider 62 that can reach the designated printer 68. In this example, a local print provider 62 is used, but a network print provider may also be used. When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also.

When the router 60 has called the print provider 62, the local print provider 62 creates 48 a job description file 64 and adds 48 a record to the job description file 64 each time it is called for the job until all the EMF page files have been spooled and each EMF file name and location is recorded in the job description file 64. When information about the last EMF file in the print job has been recorded, the local print provider 62 will call the spooler process 58 with an EndDoc function call. This signals the spooler process 58 that the complete job is spooled and ready for despooling. For multi-page jobs, these steps from initial spooling request 41 to job description file recording 48 are repeated for each page of a job.

When EMF file spooling is complete, the spooler process 58 sets a ReadyToPrint attribute on the print job and initiates an event 49 that signals to the port thread 66 that a job is available for printing. Port thread 66 responds to this event by determining the best time to start the despooling process and, at that time, loads 81 the print processor 72, as shown in FIG. 4. The print processor 72 will determine that the file format is EMF and call GDI32 56 with a Windows 95® function call 82.

GDI32 then invokes a gdiPlaySpoolStream function to read 83 from the job description file 64 which provides a fully qualified path to an EMF spool file 54. Through the job description file 64 which comprises a list of path names to EMF files, GDI32 knows about all the pages in the print job. The GDI32 gdiPlaySpoolStream function also calls GDI 50, using a thunk built into GDI32, with the path to the EMF spool file to render the page. GDI 50 only knows about one page in the print job at a time.

GDI 50 calls the printer driver 52 associated with the designated printer 68 chosen in application 40 and obtains a DC for the printer 68. GDI 50 then reads page-rendering instructions from the spooled EMF file 54 and passes 85 them one at a time to the printer driver 52 which uses as many instrucitons as are necessary to render the first part of the page. When the 16-bit printer driver 52 renders a part of the page, it passes 87 the printer-specific raw page data back to the GDI 50 which, in turn, passes 88 the raw data to GDI32 56. GDI32 56 then passes 89 the raw data to the spooler process 58 which then follows the same procedures it would for a raw format files as explained above.

Spooler process 58 calls 90 the router 60 to route the print job to printer 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a Write-Printer function call to send data through the physical port 78 connected with the bidirectional printer 68 specified previously.

A language monitor 74 is used in this example because the destination printer 68 is a bidirectional printer. When non-bidirectional printers are used a port monitor 76 would be invoked instead of the language monitor 74. A language monitor 74 and port monitor 76 may be separate components or may be integrated into one monitor. Language monitor 74 calls 93 a port monitor 76 to send print job data to the printer 68. The port monitor 76 then sends 94 the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Other versions of the Microsoft Windows operating systems, such as Windows NT and 2000 may use different printing processes as described with reference to FIG. 5. These processes may be used to print data to local, network and remote printers either directly or through a network print server. EMF data may also be processed differently. For example, in Windows NT and 2000, the entire EMF data for all pages is passed to GdiPlayEMF( ) in one pass, rather than one page at a time. If the EMF data is to be queued on a print server, the EMF data is passed directly to the print server without rendering on the client. A mirror copy of the driver on the server renders the EMF data instead.

Typically, a user will employ an application 100 to create a print job by calling GDI 102 functions. The GDI 102 and/or application 100 will then call Winspool.drv 104 which is a client interface into the spooler. This client interface, Winspool.drv 104, exports the functions that make up the spooler's Win32® API and provides RPC stubs for accessing the server. The print job is then forwarded to the spooler's API server, Spoolsv.exe 106 which can be implemented as a Windows 2000 service that is started when the operating system is started. This API server module exports an RPC interface to the server side of the spooler's Win32® API. This module implements some API functions, but most function calls are passed to a print provider by means of the router, spoolss.dll 108.

The router 108 determines which print provider to call, based on a printer name or handle supplied with each function call, and passes the function call to the correct provider 110, 112 or 114. If the selected printer is managed by the client system, the print job is handled by the local print provider, localspl.dll 110. Printers managed by the local print provider 110 do not have to be physically local to the client, they may also be directly connected to network cards without using a server. When these printers are used, the print job is passed to the kernel-mode port driver stack 116 and on to the printer 118.

When printers located on a Windows NT/Windows 2000 server are selected, the router 108 directs the print job to the network print provider, Win32spl.dll 112. This network provider uses RPC to redirect calls from the client's router to the network server's spoolsv.exe process 124 which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110 which will forward the job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 which directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on the the printer's server 134 which then directs the job to the destination printer 138.

An example of these printing processes may be explained with reference to FIG. 6 which illustrates a Windows 2000 print process. In this process, an application 150 is used to create a print job with the Graphics Device Interface (GDI) 152. When the print job's initial output file is in raw format (not EMF) 154, the printer driver's printer graphics DLL 156 works in conjunction with the GDI 152 to create a print job that is sent to the client interface 160 of the spooler. Client interface 160 sends the job to the API server 162 which forwards the job to the router 164. In this example, the router 164, sends the job to the local print provider 165 as it is a local print job.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in a raw format (not EMF) already, the job is sent to the language monitor DLL 182 and on to the port monitor 184 which sends the job to the kernel-mode port driver stack 186. Port driver stack 186 sends the job to the selected printer 188 for final printing.

When an application 150 creates a print job with GDI 152 in EMF format, the job is sent 154 to a client spooler interface 160. Client interface 160 sends the job to the API server 162 which forwards the job to the router 164. Again, in this example, the router 164, sends the job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in EMF format, the job is sent to the print processor DLL 180 which directs the job back to GDI 152 for conversion to raw format with the help of printer interface DLL 174. The converted job is then sent back through the spooler client interface 160, API server 162 and router 164 to the print provider 165. In the local print provider, the job is processed by the print job creation API 168, job scheduling API 170 and job scheduler thread 172. Because the job is now in raw format, the job is sent to the language monitor DLL 182 and on to the port monitor DLL 184 and kernel-mode port driver stack 186 before arriving at the destination printer 188.

SUMMARY

Embodiments of the present invention comprise driver-independent, printer-independent systems and methods for collated, face-up printing. Some of these embodiments may use a Page Independent Spool File Format (PISF) for supporting collated, face-up copies. Some of these embodiments may support collated, face-up printing without print driver support, printer firmware/hardware support or specialized mechanical apparatus.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
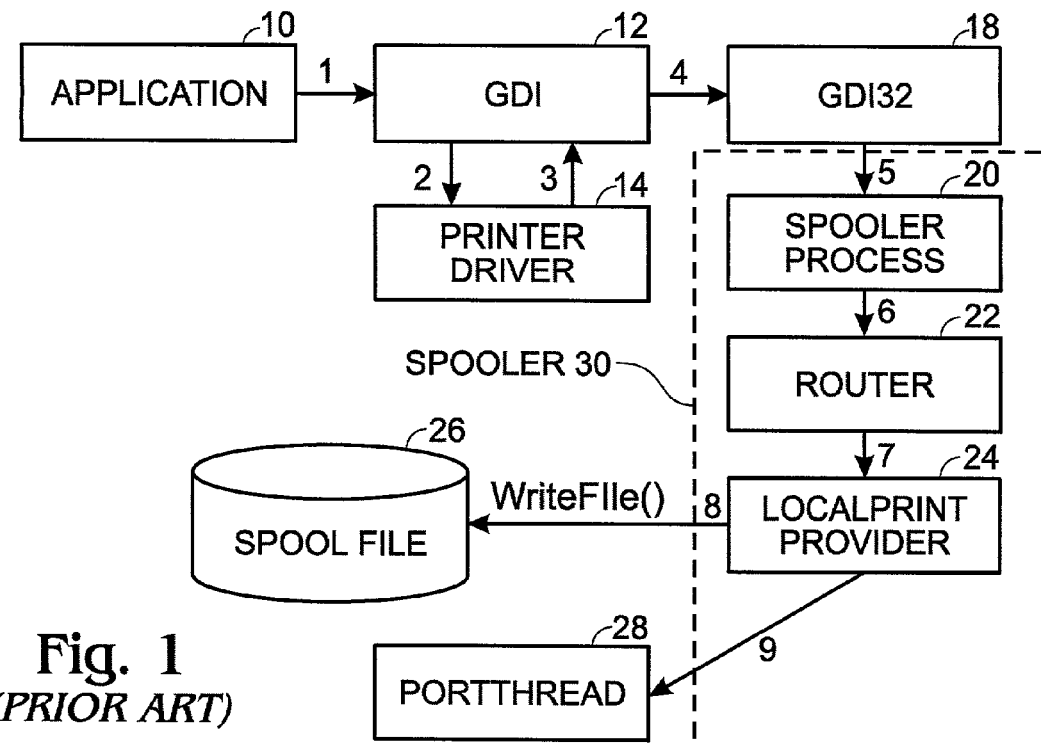
FIG. 1 is a diagram depicting a typical prior art printing process using a raw spool file.
Figure 2:
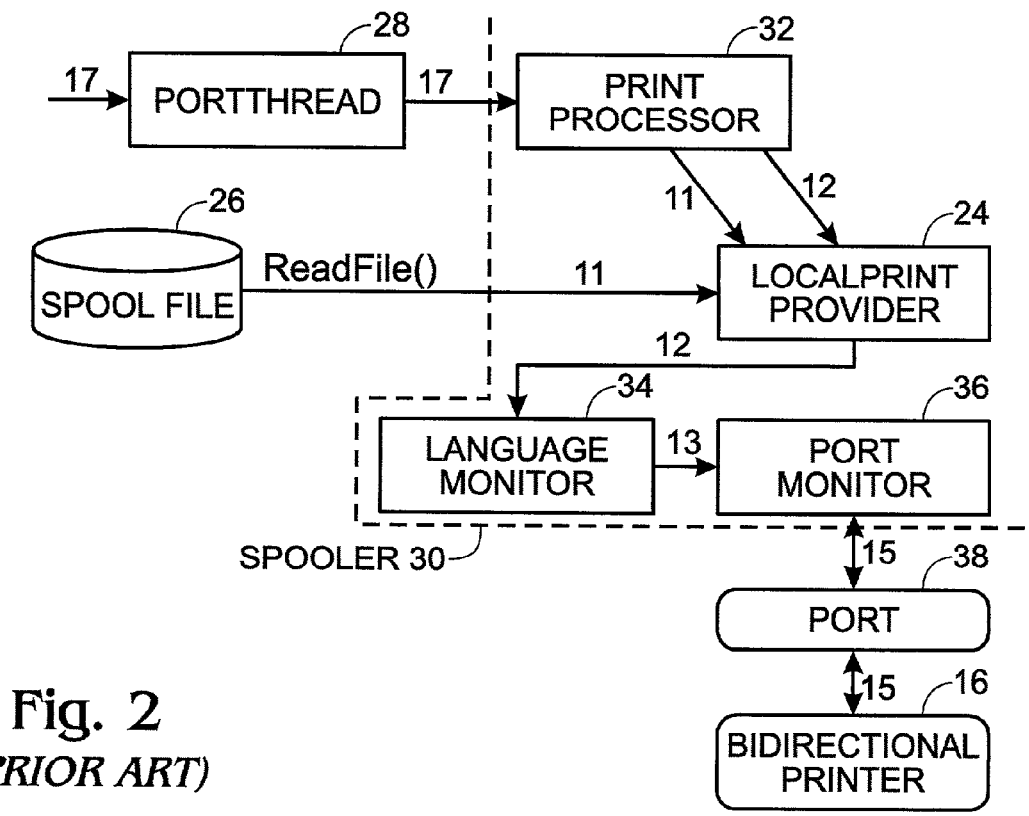
FIG. 2 is a diagram depicting a continuation of the typical prior art printing process using a raw spool file shown in FIG. 1.
Figure 3:
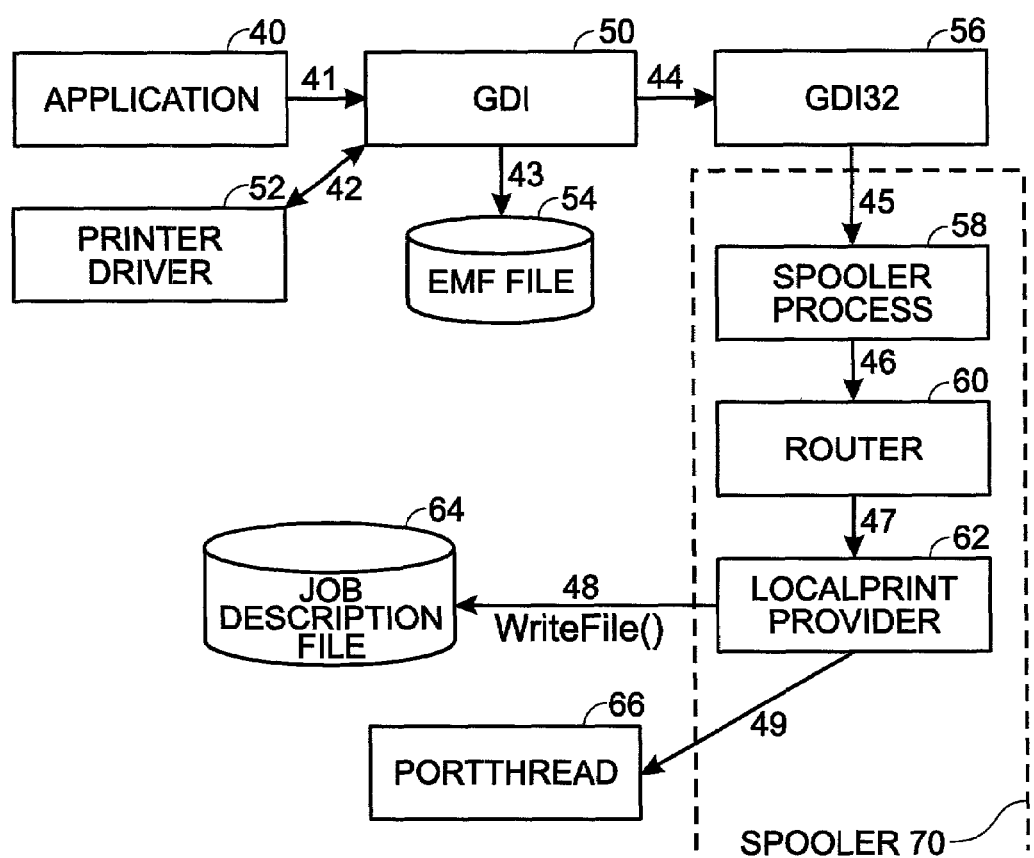
FIG. 3 is a diagram depicting a prior art printing process wherein EMF files are spooled.
Figure 4:
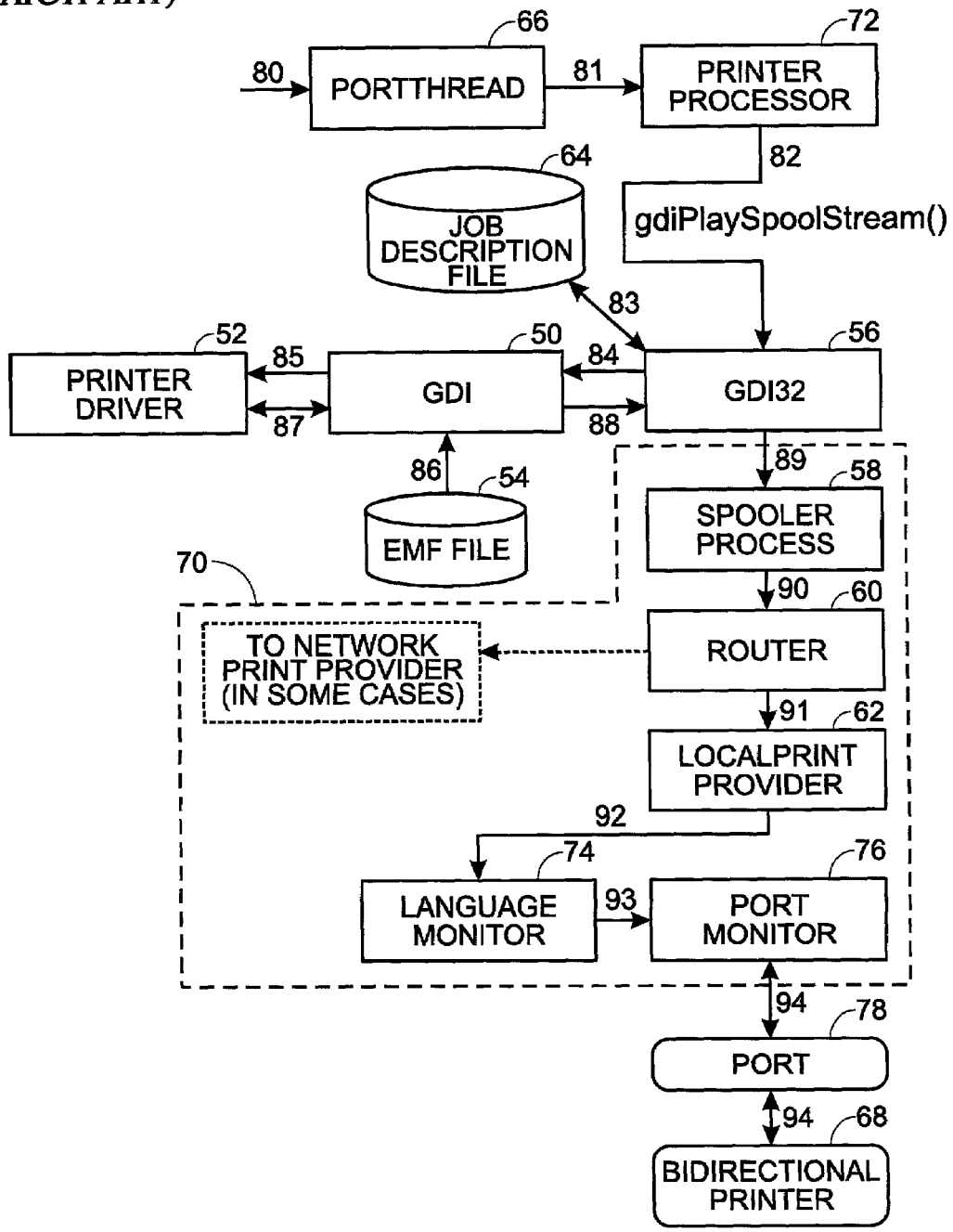
FIG. 4 is a diagram depicting a prior art printing process wherein EMF files are despooled.
Figure 5:
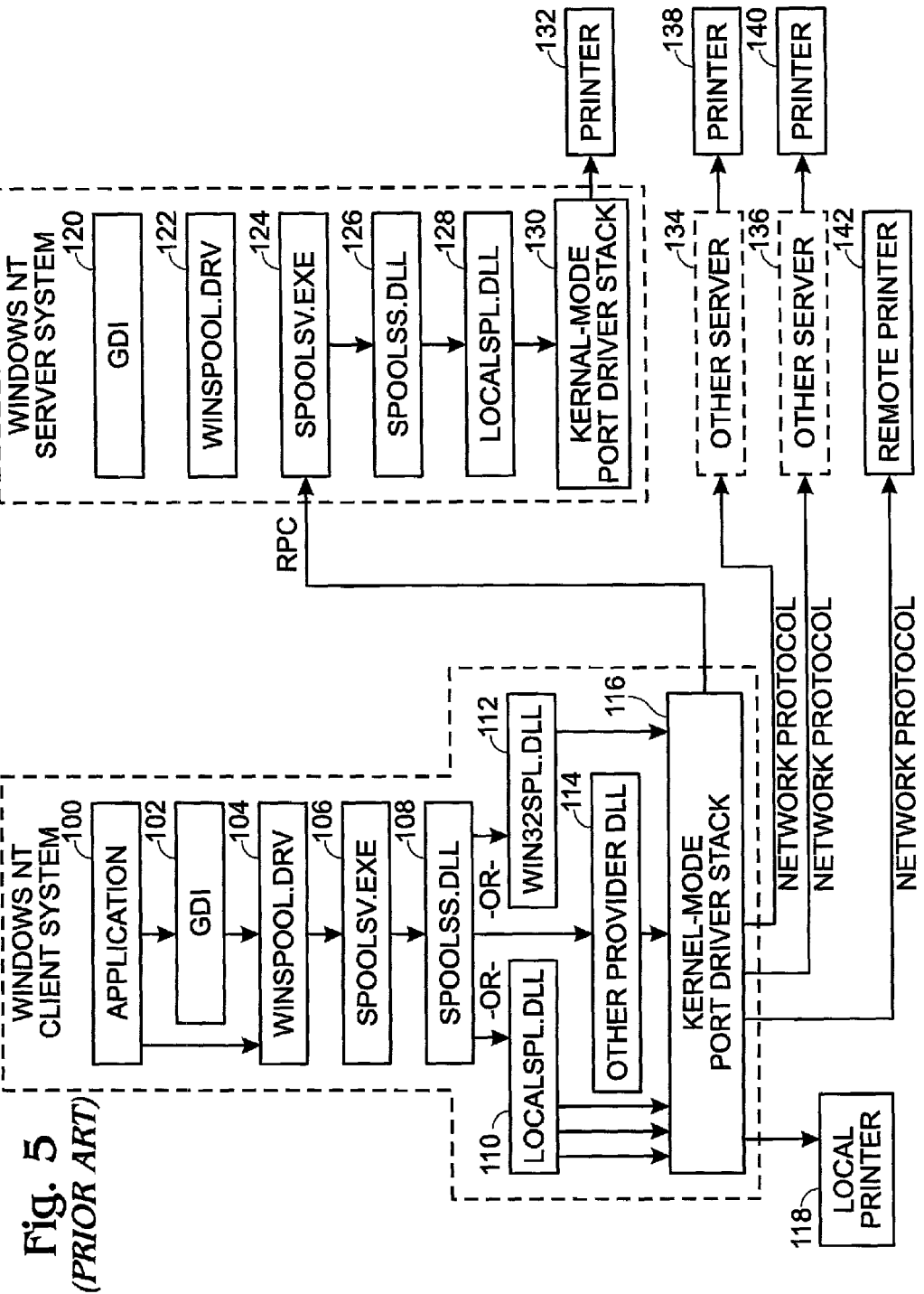
FIG. 5 is a diagram depicting a prior art printing process used in a Microsoft Windows NT/2000 operating system.
Figure 6:
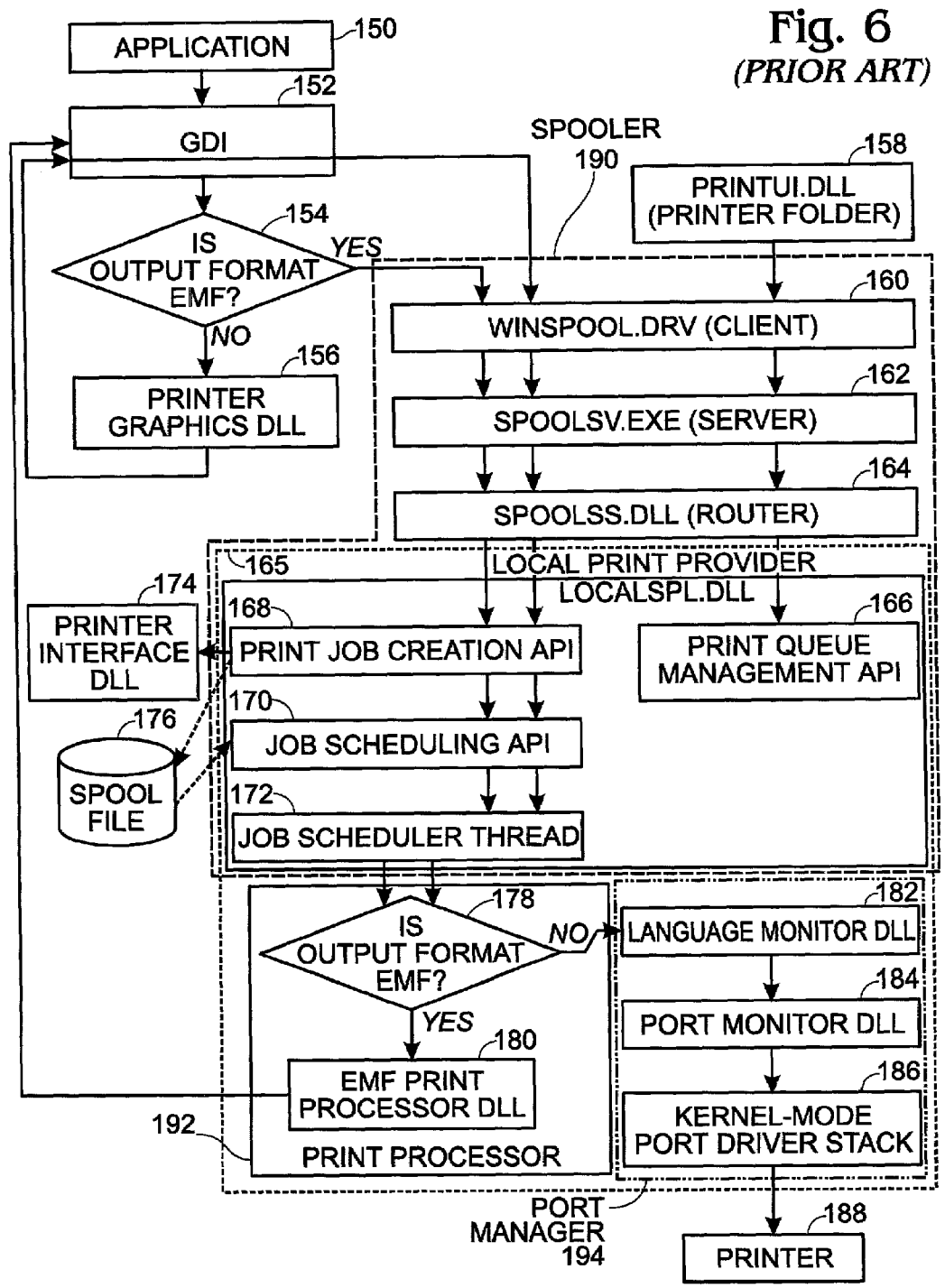
FIG. 6 is a diagram depicting the prior art printing process used in a Microsoft Windows NT/2000 operating system shown in FIG. 5.

To simplify discussion of a printing system some groups of system components may be referred to collectively. A group of components comprising a spooler client interface 160, spooler API server 162, router 164, print job creation API 168 and job scheduling API may be referred to as a spooler 190 in a Windows NT/2000 operating system. A group of components comprising a language monitor 182, port monitor 184 and port driver stack 186 may be referred to as a port manager 194. A group of components comprising a file format director 178 and EMF print processor DLL 180 may be referred to as a print processor 192.

The systems and methods of embodiments of the present invention typically operate within a system comprising one or more printers connected together in a common printer environment (locally connected, remotely connected through peer-to-peer connection, remotely connected through network print queue, combinations thereof or other network or peripheral sharing connections), a computing device capable of spooling a print job, and a printer driver and print processor compatible with the printing devices, such as in the Microsoft Windows 9x, NT,2000 and XP operating systems.

Generally, a user initiates a print job that may consist of one or more documents, each consisting of one or more pages, and collectively consisting of one or more copies. A print job may be pre-processed into printer-ready data, such as when an application renders its output in a Page Description Language (PDL), such as Hewlett Packard's Printer Command Language (PCL), Adobe's Postscript, Adobe's Portable Document Format (PDF), a Tagged Image File Format (TIFF) or rasterized (as typically done for inkjet printers), as non-limiting examples. A print job may also be journaled, where the rendering instructions are recorded, and the playback of the rendering instructions is deferred, such as when Microsoft's Enhanced Meta File (EMF) format or Sharp's Printer Meta File (PMF) format, for example.

In many operating systems including variations of Microsoft Windows and others, a user typically selects a command, a sequence of commands, and/or some stimulus to signal to the computing device that the user intends to spool a print job. The computing device responds to the user by presenting the user with a dialog (e.g., a Printer UI, command line query, front panel display) in which the user may select options relating to the spooling of the print job. One of these options is the selection of the printing device(s) (e.g., printer, plotter, MFP, CD burner, etc.) to which to despool the print job. Once the printing device(s) is/are selected, the computing device responds by loading the printer driver and print processor associated with the printing device(s) and the printer driver responds, automatically or by user initiation, to the user by presenting the user with a dialog in which the user can select options relating to the printing device's capabilities. For example, and not by way of limitation, a user may select print quality, paper size, orientation, tray selection, manual feed, stapling, watermarks and other options.

In other embodiments, the print job may be initated by another process and the selection of print options may be obtained by other means such as default settings, job tickets and other methods.

In some of these systems, the dialog presented to the user for selecting options specific to the printing device's capabilities includes a dialog on sheet assembly. Within this dialog, a user can select print order (i.e., normal order, reverse order and/or booklet), scale/placement (Duplex, Nup, PrintClub and/or Booklet), and Collation (groups or sets). Embodiments of the present invention may also comprise options for face-up printing.

Once the user has completed selecting options specific to both the print job and the printing device(s), the computing device initiates the spooling of the print job. The steps in this process may comprise: 1) the printer driver constructing print job specific information (e.g. DEVMODE in Microsoft Operating Systems); 2) compilation of rendering instructions; and either 3) rendering (i.e., preprocessing into printer ready data ); or 4) recording for deferred playback (i.e., journaling). A print job may already be rendered, partly or wholly, into printer ready data. In this case, the step of compiling rendering instructions may then be skipped partly or entirely.

The output from the print driver (i.e., spooled print job) may additionally contain information regarding sheet assembly options selected for the print job. These options may include order, scale/placement, collation and others. The output is generally referred to as a spool file and the contents are generally referred to as spool data. This data may be stored on disk, in memory, in cache, or any other form of storage compatible with the computing device.

Once the spool file has been created, the computing device passes, immediately or delayed, control of the spool file to the associated print processor for the selected printing device(s). This system may be referred to as the spooler. The print processor reads the spool file and determines if the content is pre-processed printer-ready data (e.g., RAW mode in the Microsoft Operating Systems), or journaled (e.g., EMF mode in the Microsoft Operating System).

At this point, in known systems and methods, the Spooler passes chunks of spool data to the Print Processor, until all of the spool data has been read. The Print Processor makes no interpretation of the spool data contents, but processes the data in one of two paths, depending on whether the data is recorded for deferred playback (i.e., journaled), or printer-ready data (i.e., rendered).

If the spool file was recorded for deferred playback (i.e., journaled, such as EMF, etc.), each chunk of spool data is played back to the printer driver and Graphics Device Interface (GDI) associated with the targeted printer (in a Microsoft operating system). In some situations, the playback may not consume all of the chunk of spool data and may push some of the data back to be played again. For example, the GDI in a Microsoft operating system may play one EMF file at a time, and push back any remaining data in the chunk of spool data. In these known systems, the sheet assembly must be done either by the printer driver as it renders the data or deferred to the printer firmware by prepending sheet assembly instructions to the printer-ready data that are understood by the printer firmware. An example of this known process is shown in FIG. 7.

Some basic sheet assembly, such as booklet, Nup and reverse order printing may be "hardwired" into versions of the Windows 2000 print processor in EMF mode only.

Figure 8:
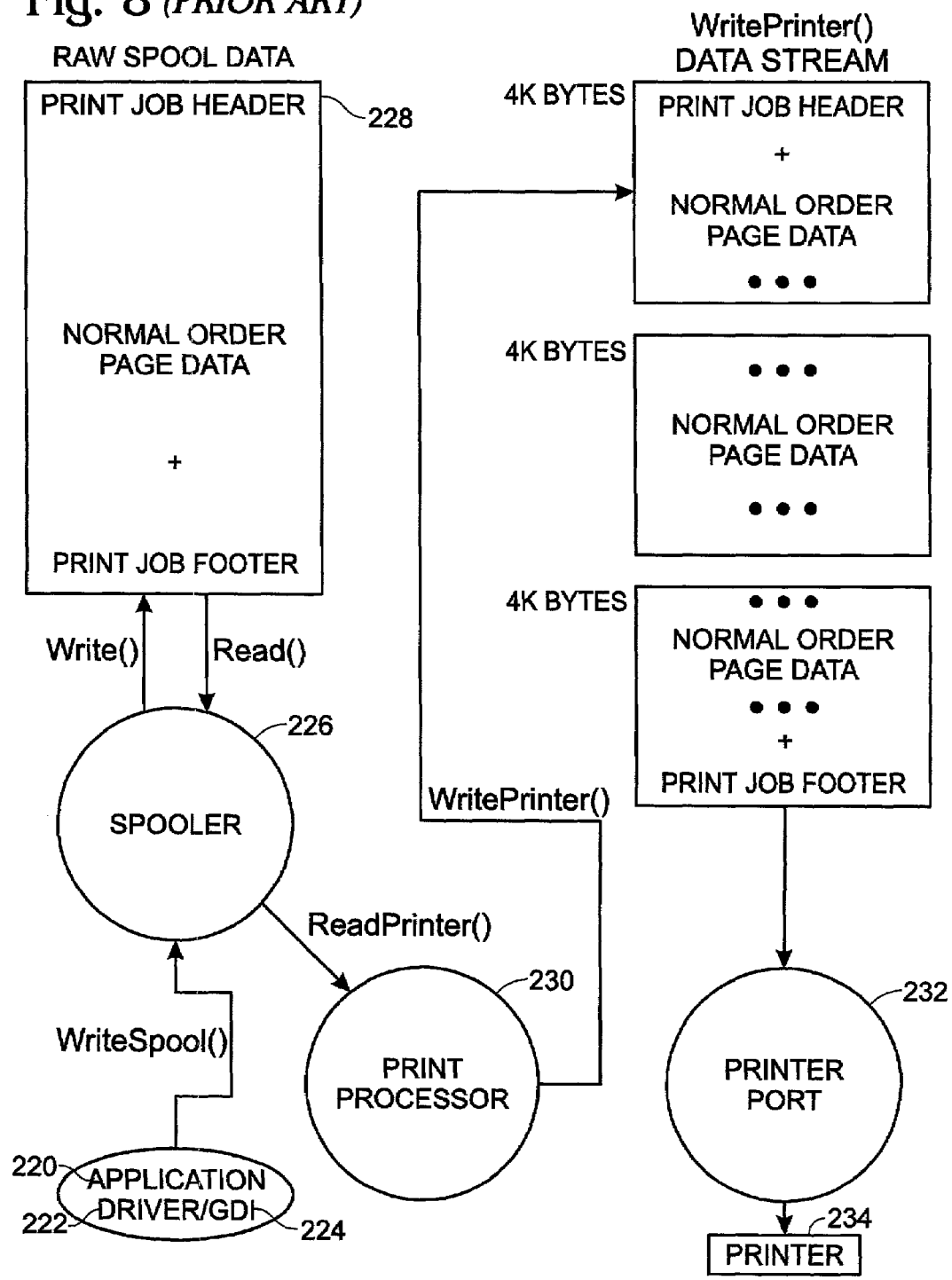
FIG. 8 is a diagram depicting a raw mode printing process.

If the spool file contains printer ready data, each chunk of spool data is written directly to the printer port associated with the targeted printer. All of the chunk of spool data is consumed by the write to the printer port. The sheet assembly, if not already performed by the printer driver, must be deferred to the printer firmware, where the printer-ready data has prepended sheet assembly instructions that are understood by the printer firmware. An example of this known process is shown in FIG. 8.

Figure 7:
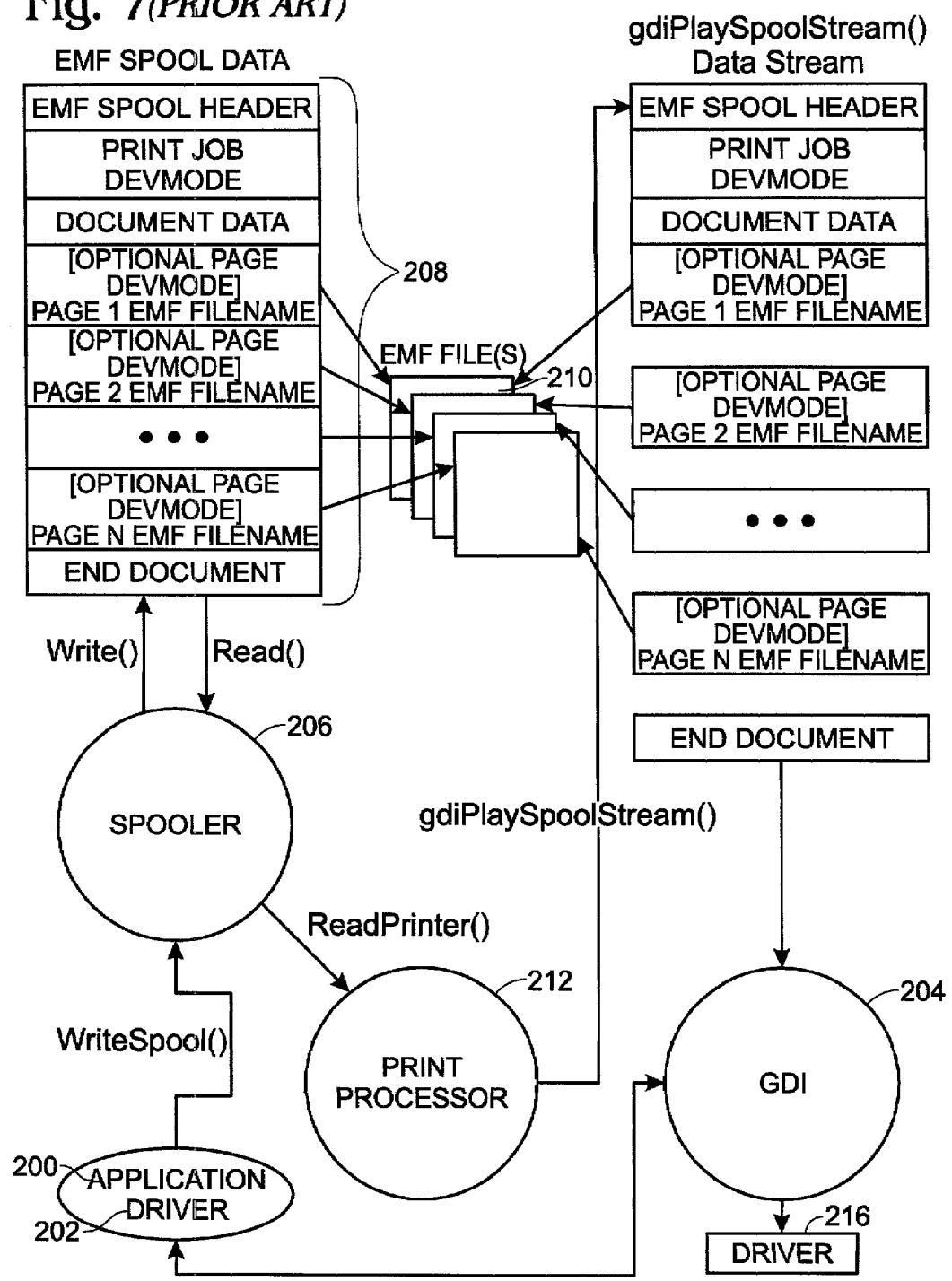
FIG. 7 is a diagram depicting an EMF mode printing process.

In some printing systems such as those used in Microsoft Windows 9x, Me, NT, 2000, XP and other systems, print data may be stored in one or more spool files as shown in FIG. 7. These spool files may use a Windows Enhanced Metafile (EMF) format to quickly record a print job and allow an application to continue running while the print job is completed. In other operating systems similar journaled files may be used.

In reference to FIG. 7, an application 200 works in conjunction with a print driver 202 and a GDI 204 to create a print job as explained above. This print job is sent to a spooler 206 such as spoolers 30, 70, 190 or others. Spooler 206 creates one or more spooler data files 208 comprising print data, Devmode data and one or more EMF filenames. Devmode data is device initialization and environment data. Typically, in a Windows 9x or Me system, multiple EMF files will be used to record a multi-page print job. Spooler data file 208 may take the form of a job description file 64, may be part of spool file 176 or may be represented in another manner depending on the particular operating system and print job type. A GDI 50 or spooler 190 will also create one or more EMF files 201 to store print data. In Windows NT/2000, a single EMF file is created with the EMF data for each page embedded within in sequential order.

After these files are created, control is passed to the print processor 212. When the system determines that actual printing should commence, the print processor 212 plays the print data stored in spool data file 208 and EMF files 201. This data is played to the GDI 204, for example GDI 50 or 152 where it is converted with the help of a driver 216 to a printer-ready format that is forwarded to a printer.

When a file is printed in a rendered (RAW mode in Microsoft systems) mode format, as shown in FIG. 8, an application 220 working with the system GDI 224 and printer driver 222 creates a print job and sends that job on to the spooler 226. Spooler 226 creates a spool file 228 comprising raw spool data. This data may be stored, for example, in Printer Job Language (PJL), Printer Control Language (PCL) or Portable Document Format (PDF). At actual printing time, the print processor 230 plays the spool file 228 to the printer port 232 where it is directed to a printer 234. Because the data is already in a rendered format in the spool file, it does not need to be processed again by the GDI 224 or driver 222.

Figure 9:
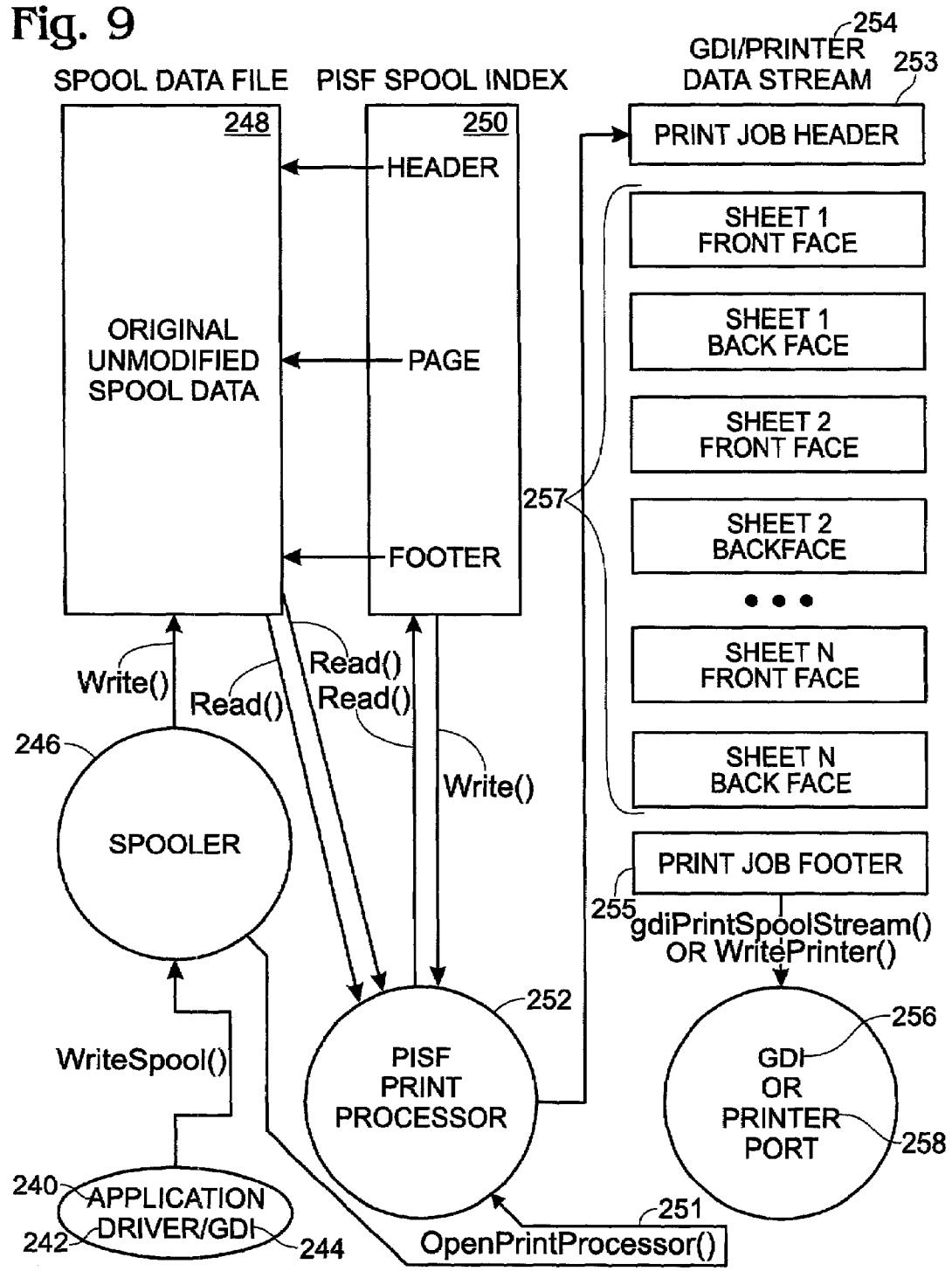
FIG. 9 is a diagram depicting a PISF spool index file of an embodiment of the present invention.

The systems and methods of embodiments of the present invention provide print-processor-based, driver-independent face-up emulation for printers without firmware support of these features. These features can be enabled through the use of a page-independent spool format (PISF) file or spool index file as shown in FIG. 9.

Embodiments of the present invention improve on existing methods, described above, by parsing the spool file to generate a Page-Independent Spool File Index (i.e., PISF Spool Index), and replacing the existing Read Spool Data interface from the Spooler (e.g., ReadPrinter( ) on the Microsoft family of operating systems) with a PISF specific Read Spool Data interface from the Print Processor.

In the example of the Microsoft family of operating systems, this can occur when the Spooler 246 initiates the despooling process by calling the OpenPrintProcessor( ) function 251 of the Print Processor 252, but before the first spool data is read by the Print Processor 252 (i.e., PrintDocumentOnPrintProcessor( )). After the call to OpenPrintProcessor( ) 251, the file pathname to the Spool Data File is known by the Print Processor 252. Whether the spool data is journaled (i.e., EMF) or printer ready data (i.e., RAW) is also known. If the spool data is printer ready data, the PDL type can be determined by examination of the first block of data, typically containing a PJL header—ending in ENTER PRINTER LANGUAGE=<PDL>. Even without a PJL header, language specific constructs (e.g., PCL, PDF, Postscript) can be quickly spotted.

Once the PDL type (or EMF) is determined, a PDL (or EMF) specific parser may be invoked to parse the Spool Data File 248 and generate a PISF Spool Index 250. The PISF Spool Index 250, which may be represented as a disk file or in-memory data structure, contains information to partition the Spool Data File 248 into regions of spool data that correspond to the Print Job Header 253, Print Job Footer 255 and the front and back of sheets 257 to be printed.

After the PISF Spool Index 250 is generated, a PDL (and EMF) independent Spool Read function, which replaces the existing ReadPrinter( ) Spool Interface, is invoked from the Print Processor 252. Unlike the existing ReadPrinter( ) function which has no knowledge of the contents of the Spool Data File 248, the new Read Data function will use the PISF Spool Index 250 to return single spool data chunks corresponding to the sequential order: Print Job Header, the front and then back of each sheet, and the Print Job Footer.

These embodiments typically comprise one or more applications 240 which generate printable documents. The printing process is typically initiated with the application calling the GDI 244 and driver 242 to create a print job which is sent to the spooler 246. As explained above, the spooler 246 may comprise many components and may operate differently according to the print job file format and the operating system. Generally, the spooler 246 creates a spool data file 248 which records the print job or portions thereof in a static format. These embodiments further create a PISF spool index file 250 which comprises print job data in a page independent format. Once the PISF spool index file 250 has been created, a custom print processor 252 may manipulate and modify the PISF file 250 to achieve different sheet assembly and formatting options comprising face-up emulation and others. In some embodiments, print processor 252 may comprise a user interface to prompt for user preferences. A user interface may also reside elsewhere such as, but not limited to, spooler 246, driver 242 or other components. A user interface may also act as a stand-alone component which allows print system components to access its data. In other embodiments, a user interface is not required.

When the print system determines that the print job should be forwarded to the printer port 258, print processor 252 plays back or writes the print job to the correct destination. For EMF files, the files are played to the GDI 256 and any other components necessary for rendering the job and getting it ready for transmission to the destination printer. For raw data files, the files may be written directly to the port monitor where they are directed to the printer port 258 and on to the destination printer. However, in these embodiments, print processor 252 reads PISF file 250 rather than spool data file 248. PISF spool index file 250 may be used to control the organization or format of the print job. For example, and not by way of limitation, PISF spool index file 250 may be used to convert a conventional face-down print job to a face-up format. In this manner, PISF spool index file 250 allows a user to change to face-up format from the print processor 252. These methods may be used to add face-up printing functionality and features to duplexing systems which did not previously have those features. While prior art systems needed specialized printer-specific drivers or specialized hardware, embodiments of the present invention can achieve the same functionality simply by replacing the print processor. Because the print processor is not a printer-specific component, a single print processor may be used to upgrade a wide array of printers to the improved functionality provided by embodiments of the present invention. In some embodiments, spooler components may also be used to achieve this functionality.

Figure 10:
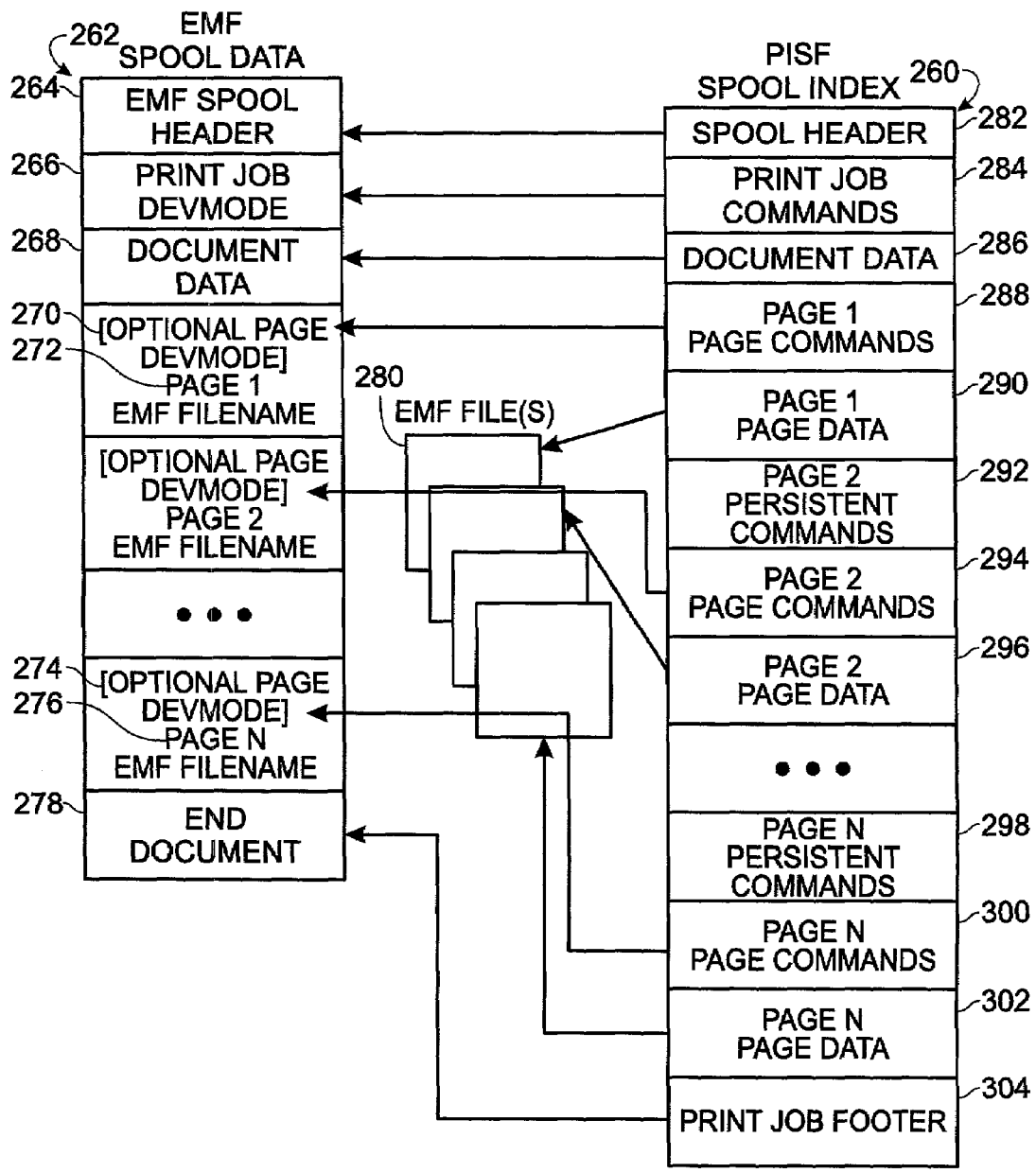
FIG. 10 is a diagram depicting the relationship of an EMF spool data file to a PISF spool index file of an embodiment of the present invention.

Details of specific embodiments of PISF spool index files 260 may be explained with reference to FIG. 10 wherein a PISF file 260 created from an EMF spool data file 262 is depicted.

If the Spool Data is journaled, as in the case of EMF or PMF, the contents of the Spool Data File 262 already corresponds closely to the PISF Spool Index 260. In the example of EMF, the Spool Data File 262 consists of a Spool File Header 264 for identification, a Print Job DEVMODE 266 (i.e, Print Job Header), Document Data 268 which is descriptive information on the print job, but not part of the print data, and a sequence of optional Page DEVMODE 270, 274(i.e., Page Commands) and EMF page file names 272, 276 (i.e., Page Data), one per page, and ending with an End Document Footer 278 (i.e., Print Job Footer). The Page Data is stored outside of the Spool Data File 262 in individual EMF Files 280, one per page in some systems. Other systems, such as Windows NT/2000 may use a single EMF file for multiple page documents.

In Windows NT/2000, EMF page data is embedded where the EMF pathname would have been in the Windows 9x format. Each EMF page data is preceded by a marker that has an offset link to the next page. Therefore, pages can be traversed without parsing the entire file.

The PISF Spool Index 260 comprises an ordered collection of records, each containing information for locating and extracting spool data corresponding to the respective record type. A PISF Spool Index 260 does not contain any spool data. The PISF Spool Index 260 may comprise the following records: 1) Spool Header 282, 2) Print Job Commands 284, 3) Document Data 286, 4) One or more sequences of a) Page Persistent Commands 292, 298, b) Page Commands 288, 294 & 300 and c) Page Data 290, 296 & 302, and 5) Print Job Footer 304.

For EMF files, the Spool Header 282, Print Job Commands 284, Document Data 286 and Print Job Footer 304 may have a one-to-one mapping with the EMF Spool Header 264, Print Job DEVMODE 266, Document Data 268, and End Document 278 respectively.

For each page, page commands 288, 294 & 300 are the preamble to each page which setup the printing of the page and may include commands for page orientation, dot resolution, paper sizes, etc. These page commands 288, 294 & 300 may be optional in some embodiments. Page Data 290, 296 & 302 is the actual data to print on the page such as text, vector and graphics. Persistent commands 292 & 298 may be any page commands that persist across page boundaries (i.e., do not get reset). When printed in normal order, the persistent data commands 292 & 298 are 'inherited' along with the current page commands for the current page being printed.

For EMF files, the Page Commands 288, 294 & 300 and Page Data 290, 296 & 302 may have a one-to-one mapping with the optional Page DEVMODE(s) 270 & 274 and EMF File(s) 280 respectively. If an optional Page DEVMODE 270 & 274 is present, all page commands 288, 294 & 300 inherited from the Print Job DEVMODE 266 are merged and the new merged Page DEVMODE 270 & 274 overrides the Print Job DEVMODE 266 for all subsequent pages (i.e., persists) in normal order until another Page DEVMODE 270 & 274 is encountered. To preserve this relationship, the Page 1 Persistent Command record points back to the Print Job Commands 284 (i.e., Print Job DEVMODE 266), and the remaining Page Persistent Command records 292 & 298 point back, if any, to the Page Command record 288, 294 & 300 of the last previous page that had an optional Page DEVMODE 270 & 274.

EMF spool data file 262 may be a job description file 64 or similar file. EMF spool data file 262 may comprise an EMF spool header 264 and print job devmode data 266 which comprises device initialization and environment data. EMF spool data file 262 will typically also comprise document data 268 and the filename or filenames 272, 276 of EMF files 280 containing data to be printed in the print job. An EMF spool data file 262 may also comprise optional page devmode data 270, 274. An EMF spool data file 262 is generally terminated with an end document statement 278.

In embodiments of the present invention which create PISF spool index files 260 in relation to print jobs in EMF mode, information in the EMF spool data file 262 is indexed in the PISF file 260. PISF spool index file 260 comprises a spool header 282 which comprises information from the EMF spool header 264. PISF index file 260 may also comprise print job commands 284 which comprise links and information related to the print job devmode data 266. A PISF file 260 may also comprise document data 286 related to the document data 268 in the EMF spool data file 262. A PISF file 260 may also comprise page commands 288, 294 and 300 that may comprise page formatting and orientation data for each page of a print job. These page commands 288, 294 and 300 are related to the optional page devmode data 270, 274 contained in the EMF spool data file 262. A PISF file 260 may also comprise page data 290, 296 and 302 which links to the EMF files 280 for each page in the print job. In multi-page print jobs, pages subsequent to the first page, such as page 2 and page N in this example, need to be converted to a page-independent format so that each page may be manipulated as an independent unit. This may be achieved by placing persistent commands 292, 298 in the PISF file 260. Persistent commands 292, 298 comprise page formatting, orientation and other data that is stored as document data 268 or other data that is stored in a document-wide format in the EMF spool data file 262. A print job footer 304 is used to conclude a PISF spool index file 260.

Figure 11:
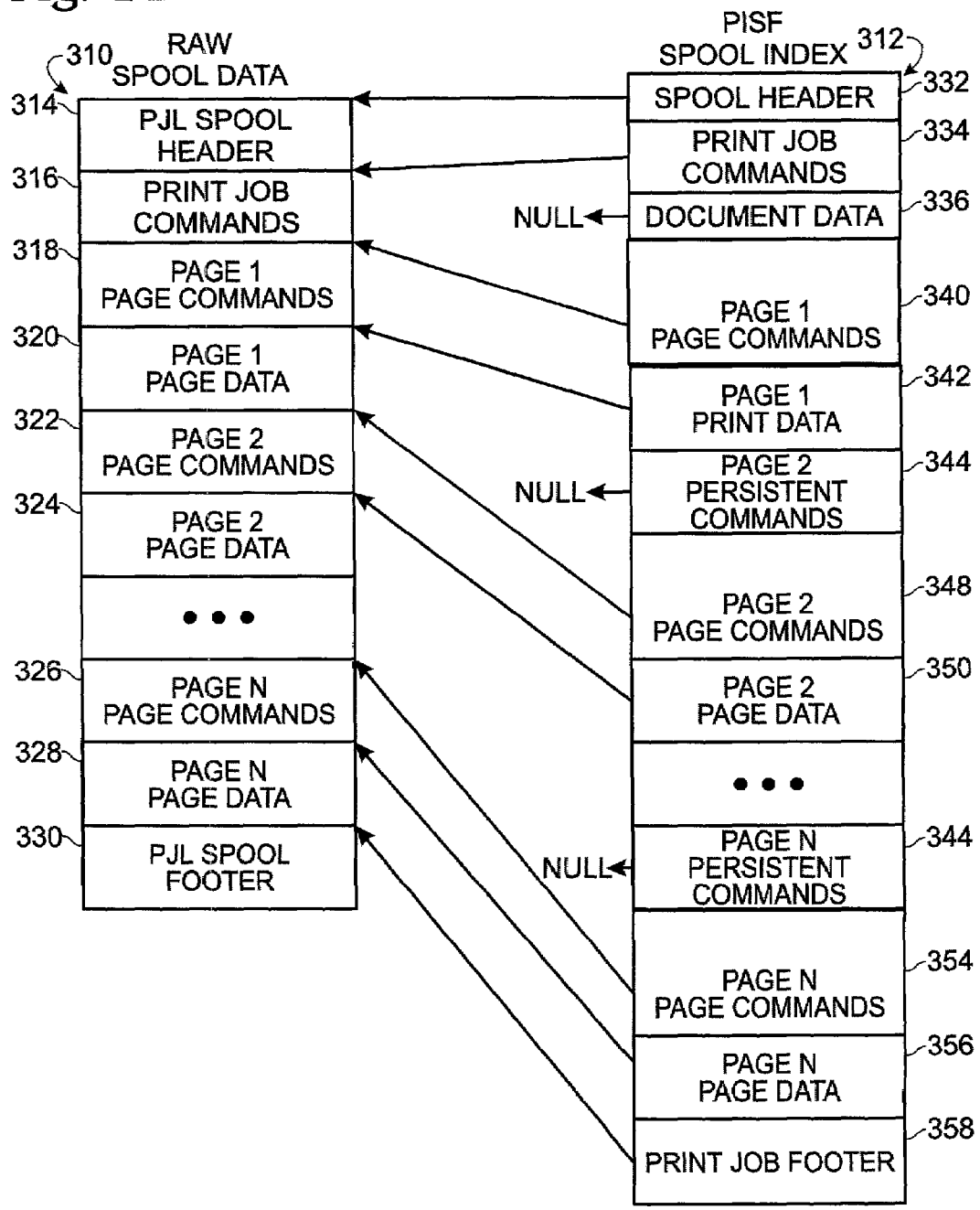
FIG. 11 is a diagram depicting the relationship of a raw spool data file to a PISF spool index file of an embodiment of the present invention when a page-independent printer language is used.

Some embodiments of the present invention may be used in conjunction with raw mode print jobs which use page-independent printer languages such as PCL XL, Postscript and PDF as shown in FIG. 11. When this is the case, the contents of the Spool Data File 310 already corresponds closely to the PISF Spool Index 312, with the exception that there is no persistent data 344 in page independent formats. Generally, there is no document data 336 as well, unless embedded in PDL-specific, non-printing comments. In these situations, a raw spool data file 310 is generated by the print system. Raw spool data file 310 comprises a header file such as Printer Job Language (PJL) spool header 314 which may identify file characteristics and location. Raw spool data file 310 also comprises print job commands 316, page commands 318, 322 & 326 and page data 320, 324 & 328. Page commands 318, 322 & 326 may comprise page formatting and orientation data. Page data 320, 324 & 328 comprises a description of the image to be printed on each page. A raw spool data file 310 may be concluded with a print job spool footer such as PJL spool footer 330.

A PISF spool index file 312 created from a raw spool data file 310 comprises a spool header 332 which relates information in the raw file header such as PJL spool header 314. A PISF spool index file 312 may also comprise print job commands 334 which comprise links to print job commands 316.

Because raw spool data file 310 is already in a page-independent format, document data 336 may not contain document-wide formatting and other information. Formatting data may be contained in page commands 340, 348 & 354 in a page-independent format. Data for a specific page is contained in page commands 340, 348 & 354 and page data 342, 350 & 356. These file segments may contain actual print job data or, in some embodiments, may comprise modifiable links to the raw spool data file 310. Due to the page-independent format of the raw spool data 310, persistent commands 344 may not exist as their information is already stored in a page-independent format. A PISF spool index file 312 of these embodiments may be terminated with a print job footer 358.

For page-independent PDLs, each pair of Page Commands 318, 322 & 326 and Page Data 320, 324 & 328 are independent of all other pages. In other words, if combined separately with the Print Job Commands 316, each page would print identically, as if all pages combined together with the Print Job Commands 316. Since no page commands persist across the page boundaries, the Page Persistent Data records 344 are NULL.

If the Spool Data is printer ready data and in a page-dependent format, such as PCL 5, the contents of the Spool Data File 360 already corresponds closely to the PISF Spool Index 362. Generally, there is no document data 386 as well, unless embedded in PDL-specific non-printing comments. For page-dependent PDLS, each pair of Page Commands 368, 372 & 376 and Page Data 370, 374 & 378 are not independent of all other pages. The Page Commands 368, 372 & 376, such as loading font set, persist to the subsequent pages until overridden by another Page Command 368, 372 & 376. Unlike EMF, where the optional Page DEVMODEs replace the persistent data as a whole, the persistent data is accumulative. The Persistent Data records 392 & 398 point back to the previous page's Page Command records 388 & 394, whose page's Persistent Data record points back to its previous page's Page Command record. In this case, the persistent data on any one page, is the recursive traversal and accumulation of the Page Command records in sequential normal order of pages 1 . . . n−1, where n is the current page.

Figure 12:
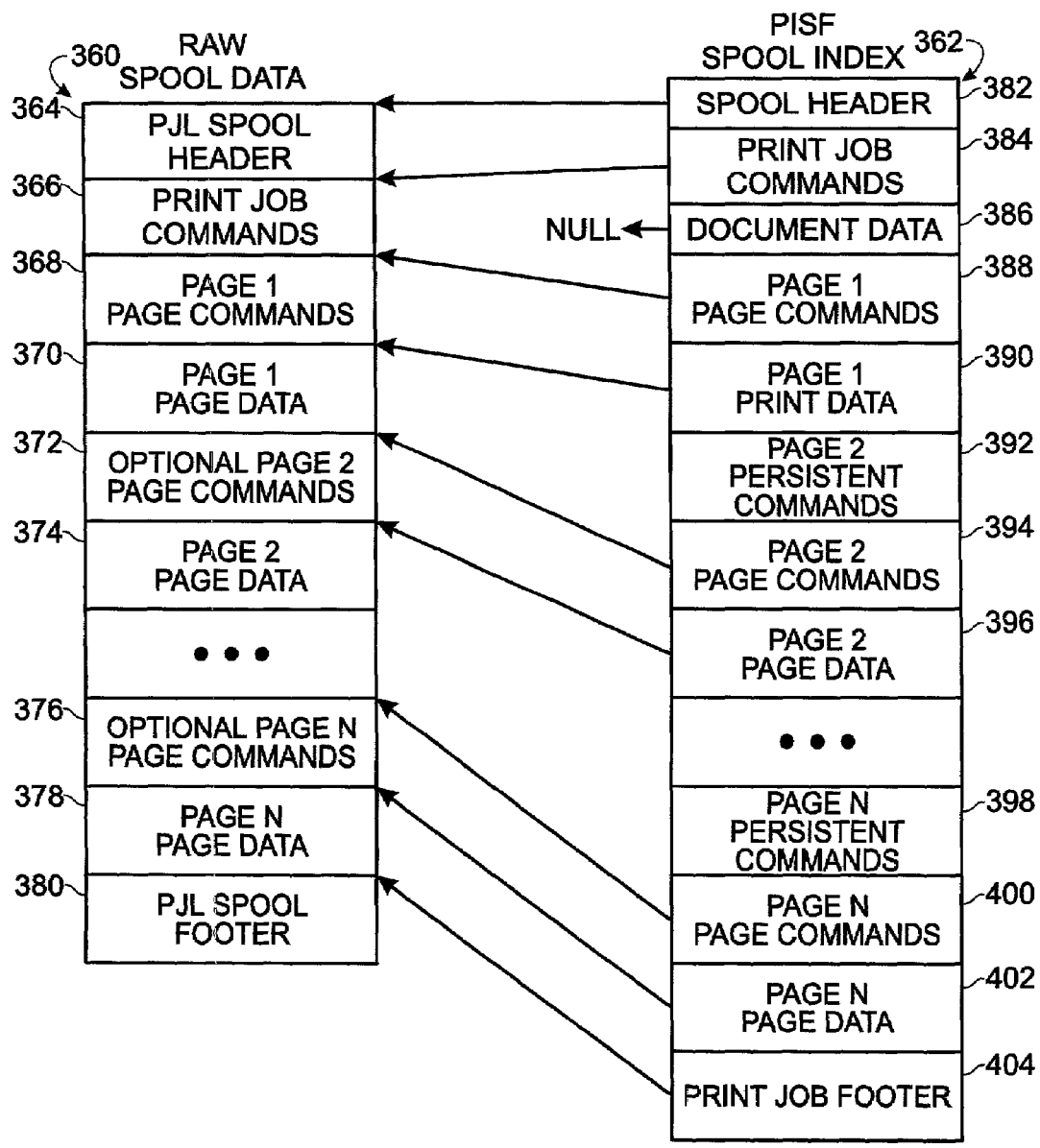
FIG. 12 is a diagram depicting the relationship of a raw spool data file to a PISF spool index file of an embodiment of the present invention when a non-page-independent printer language is used.

Other embodiments of a PISF spool index file 362 may be described with reference to FIG. 12. These embodiments relate to raw spool data files 360 which are in a page-dependent format such as files which use the printer command language PCL 5. These raw spool data files comprise print job information in a spool header such as a PJL spool header 364 which identifies file characteristics. Further print job formatting and orientation data may be contained in print job commands 366. This document-wide date is typically followed by page commands 368 for page one and any subsequent pages that have commands that differ from those established for previous pages. Page commands for page two 372 and other pages such as page N 376 are optional and will not generally be present unless the formatting of those pages differs from that of page one. Following page commands 368 and 372 & 376 (when present) will be the page data 370, 374 & 378 for those pages. Page data 370, 374 & 378 comprises the actual text and graphic elements to be printed on the media. A page-dependent raw spool data file 360 may be terminated with a print job spool footer 380, such as in PJL.

A PISF spool index file 362 that is related to a page-dependent raw spool data file 360 typically comprises a spool header 382, print job commands 384, page commands 388, 394 & 400, page data 390,396 & 402, persistent commands 392 & 398 and a print job footer 404. Spool header 382 may comprise file identification information. As PISF spool index file 362 is an index file it comprises links to the information stored in the raw spool data file 360. Print job commands 384 comprise links to or information related to formatting and orientation data for the print job as a whole. Page commands 388, 394 & 400 comprise page-specific formatting and orientation data. Page data 390, 396 & 402 comprise the text and graphics to be printed on the media. Persistent commands 392 & 398 comprise links to data necessary to make each page independent from the others. A PISF spool index file 362 may be terminated with a print job footer 404.

Figure 13:
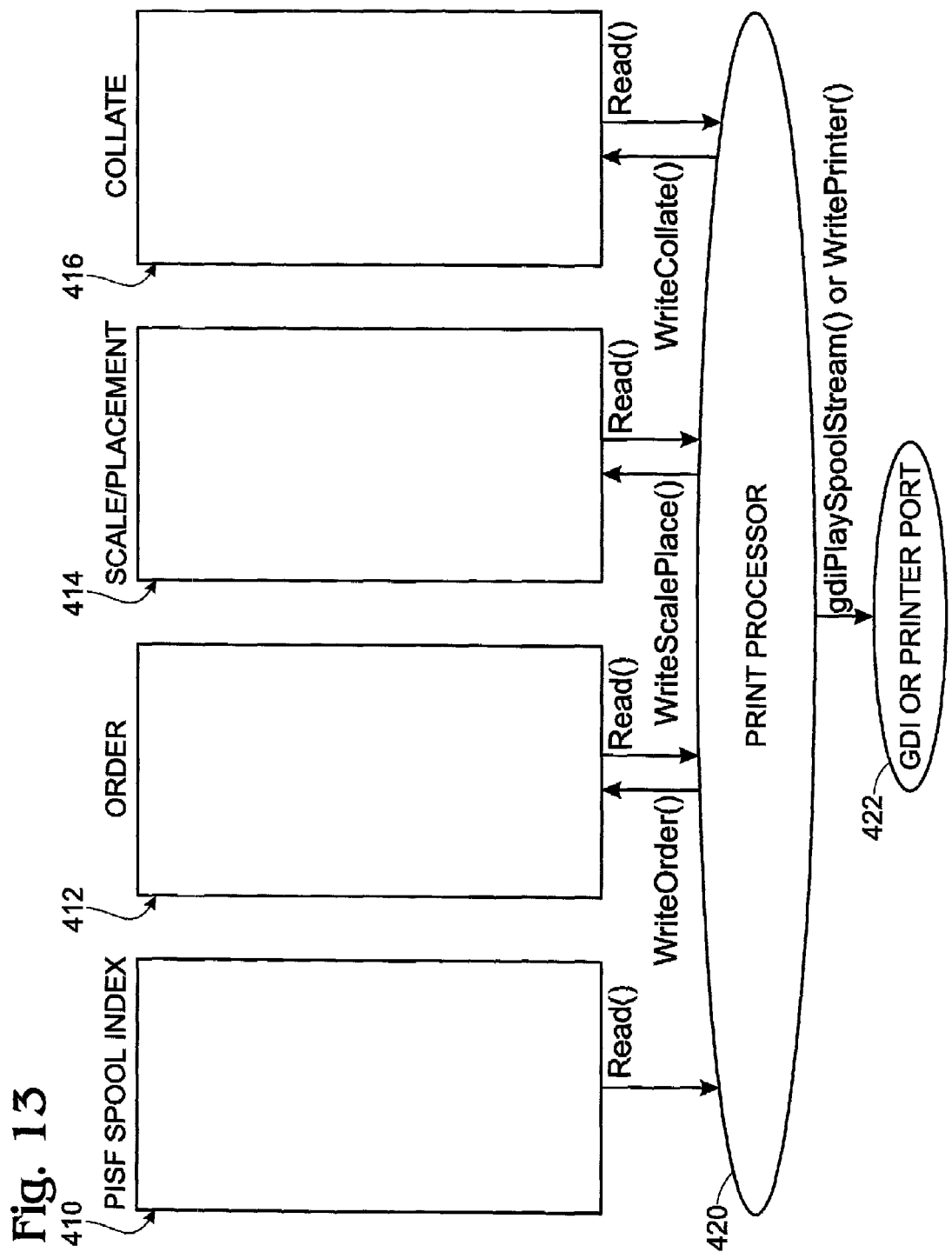
FIG. 13 is a diagram depicting various processes of sheet assembly in some embodiments of the present invention.

Once the PISF Spool Index is generated, document output format can be modified by manipulating the PISF Spool Index file 260, 312 & 362, without any additional disk space and disk I/O. In contrast, manipulation of the spool data can require significant resources which are not always available. PISF spool index file manipulation may be further explained in reference to FIG. 13.

This may be accomplished by replacing the Spool Read function, ReadPrinter( ), which reads sequential blocks directly from the Spool Data 262, 310 & 360, by a new Read Spool function which performs a virtual read I/O instead of a direct I/O. The virtual read I/O goes through the PISF Spool Index file 260, 312, 362 & 410 requesting conceptual constructs, such as the Print Job Commands, data for a specific page, and Print Job Footer. The virtual read I/O uses the PISF Spool Index to locate and assemble the spool data, which may not be physically contiguous. The spool data is then returned back to the print processor 420 in a form that appears to be a single contiguous block of spool data. The Read Spool function in the Print Processor 420 does not need to have any knowledge of the PDL (or EMF) type or the Spool Data layout on disk.

In some embodiments, face-up output may be accomplished by manipulating the PISF Spool Index file 260, 312, 362 & 410 through several passes: 1) Page Order; 2) Page Scale and Placement; and 3) Sheet Collation. This Ordered Index File Processing (OIFP) provides for simple and efficient processing and manipulation of index files. Each pass transforms the current PISF Spool Index file 410 into a new PISF Spool Index file 412, 414 & 416, from which the new Read Spool function would return data in an order already assembled for the selected sheet assembly options.

In these embodiments incorporating OIFP, the first pass 412 processes the page order for sheet assembly options that effect sheet order such as reverse order, booklet, and duplex formats. The second pass 414 processes the page scale and placement for sheet assembly options, such as booklet, Nup, and PrintClub. The third pass 416 processes the sheet collation for sheet assembly options such as Collate, Sets and Groups.

Each pass is independent of the other passes and does not require any knowledge of the prior pass. However, in these embodiments, the passes must be in the specified order: 1) Order; 2) Scale/Placement; 3) Collate as required for OIFP. In alternative embodiments, the order of the passes may be changed, but some passes may require knowledge from previous passes.

Once the PISF spool index file 410 has been processed for order 412, scale and placement 414 and collation 416 to achieve the desired document formatting, the modified spool index file 416 may be read by a print processor 420 and played to the appropriate GDI, printer port or other element for printing.

Embodiments of the present invention may be used to enable face-up printing on printers which are otherwise limited to face-down printing. This can be achieved without adding hardware, storage, memory or sheet-handling mechanical apparatus.

A face-down printer is a printer that has no hard drive or other capacity to store print data, but that has a roller or other mechanical apparatus that forces the output to be ejected to the output bin in a face-down position.

The lack of a hard drive or other storage or memory requires the printer to print each page as it is received. These printers cannot store pages and print in another order, like reverse order. A document must be printed in the order it is sent from the host computer. If page 1 is sent first and printed first, it ends up at the bottom of the output tray. When page 2 is sent and printed, it would appear on top of the first page in the output tray. With this type or printer printing in a face-up orientation, the pages would need to be printed facing upward, but in reverse order (i.e., 2, 1) thereby creating a need to hand collate any face-up job.

Many printers overcome this problem by printing in a face-down orientation. In a face-down orientation, the first page appears upside down on the bottom of the output tray. The second page appears upside down on top of the first page in the output tray. This method outputs the document with correct collation or page order, but the document is output face-down and cannot be easily identified without removal from the output tray.

Embodiments of the present invention improve on known methods by printing the pages collated face-up, instead of face-down, and without the need for mechanical apparatus such as a roller that flips the output pages over. These methods and systems may be used in conjunction with printers and printer output in many formats and orientations.

Figure 14:
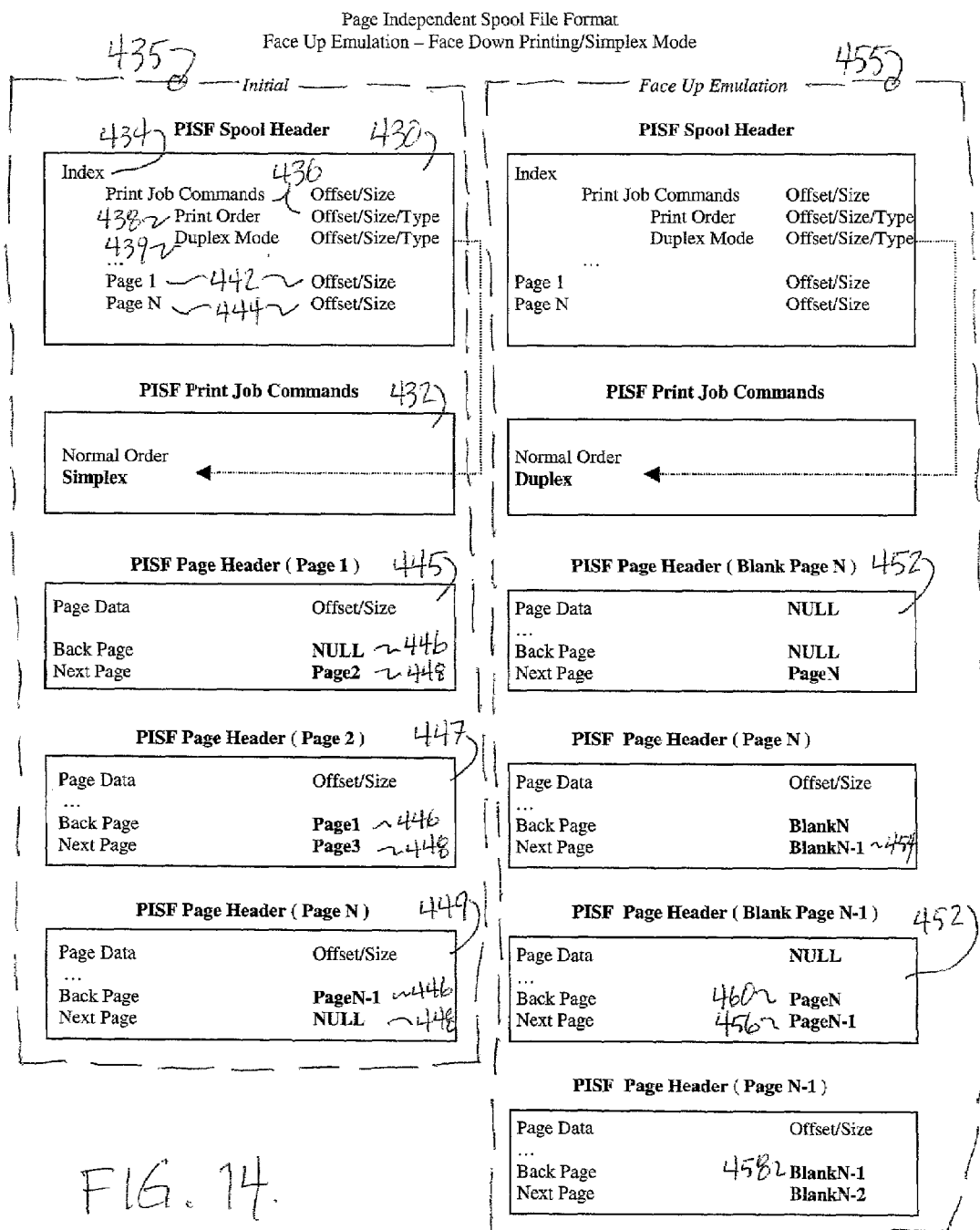
FIG. 14 is a diagram depicting a file format for achieving face-up, collated output from a simplex, face-down print job.

For simplex (i.e. single-sided) printing on a duplex printer that normally outputs printed documents in a face-down orientation, a PISF Spool Index may be manipulated to change the side of the paper on which output is printed and reverse the sequential order of pages sent to the printer to enable face-up output. These methods and systems may be explained with reference to FIG. 14.

A PISF Spool Header 430 contains an index 434 to locate records within the PISF Spool File 435. The index 434 contains information for locating the Print Job Command record 436, the location, size and data type of the Duplex Mode command index 439 within the Print Job Command record 436, and information for the Page record for the first document page 442 and last document page 444 in sequential normal order. Each Page record 445, 447 & 449 contains an index to locate the Page record for the previous page 446 and the next page 448 in sequential normal order.

This information may be used to change a Print Job Command from Simplex to Duplex in the PDL (or EMF) specific language format and to reverse the print order. The index 434 and page records 445, 447 & 449 may also be modified to change the first page to the last page and to change the last page to the first page. The index 434 may also be used to traverse each Page record 445, 447 & 449 and change the Back Page record 446 to the Next Page record 448 and change the Next Page record 448 to the Back Page record 446. This process effectively reverses the print order.

Because the job is changed from simplex to duplex format, a blank page must be inserted for the back side of each page to retain the appearance of a simplex format document. A Blank Page record 452 is inserted between each Page record by setting the Next Page record of the previous page 454 to the Blank Page record 452, the Next Page record of the Blank Page 456 to the next page, and the Back Page record 458 of the next page to the Blank Page, and the Back Page record 460 of the Blank Page to the previous page.

Below is an example output:

| Original | Face Up Emulation |
| --- | --- |
| Simplex | Duplex |
| Page 1 | Blank Page (flip paper over) |
| Page 2 | Page N |
| . . . | . . . |
| Page N | Blank Page (flip paper over) |
| | Page 2 |
| | Blank Page (flip paper over) |
| | Page 1 |

Note, in EMF mode, none of the data has been rendered yet. Therefore, the rendered data can be passed to the printer in reverse order without rendering all the pages first.

Figure 15:
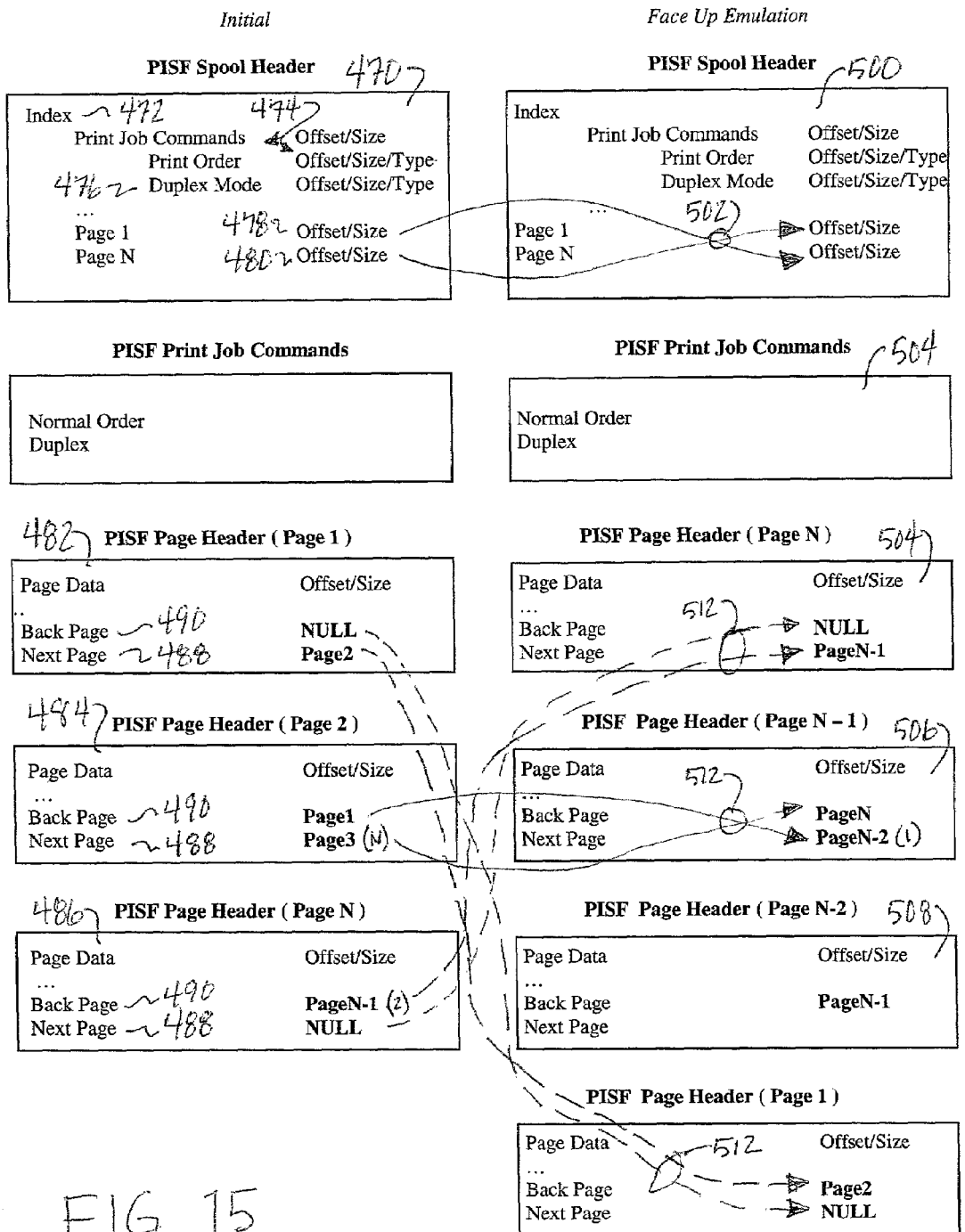
FIG. 15 is a diagram depicting a file format for achieving face-up, collated output from a duplex, face-down print job with an even number of pages.

Embodiments of the present invention may also be used to convert face-down, duplex print jobs to a face-up orientation without the addition of hardware, memory or mechanical apparatus. These embodiments may be explained with reference to FIG. 15

To accomplish this conversion for duplex (i.e. double-sided) printing on a face-down printer, the PISF Spool Index may be manipulated to change the side of the paper on which the first printed page is printed, if the job contains an odd number of pages, and reverse the sequential order of pages sent to the printer. This process ensures that the blank side of a page at the end of a document with an odd number of pages remains at the back of the document when the print order is reversed.

The PISF Spool Header 470 contains an index 472 to locate records within the PISF Spool File. The index 472 contains information for locating the Print Job Command record 474, the location, size and data type of the Duplex Mode command index 476 within the Print Job Command record 474, and information for the Page record for the first page 478 and last page 480 in sequential normal order. Each Page record 482, 484 & 486 contains an index to locate the Page record for the previous page (back page) 490 and the next page 488 in sequential normal order.

This information is used to change the Print Job Command from face-down to face-up in the PDL (or EMF) specific language format. This may be done by modifying 502 the index 470, 500 so that the first printed page is the last page of the document, and the last printed page is the first page of the document. Each Page record 504, 506, & 508 is also modified 512 and the index is changed so that the Back Page records 490 and the Next Page records 488 reflect the reverse of the initial page order.

Figure 16:
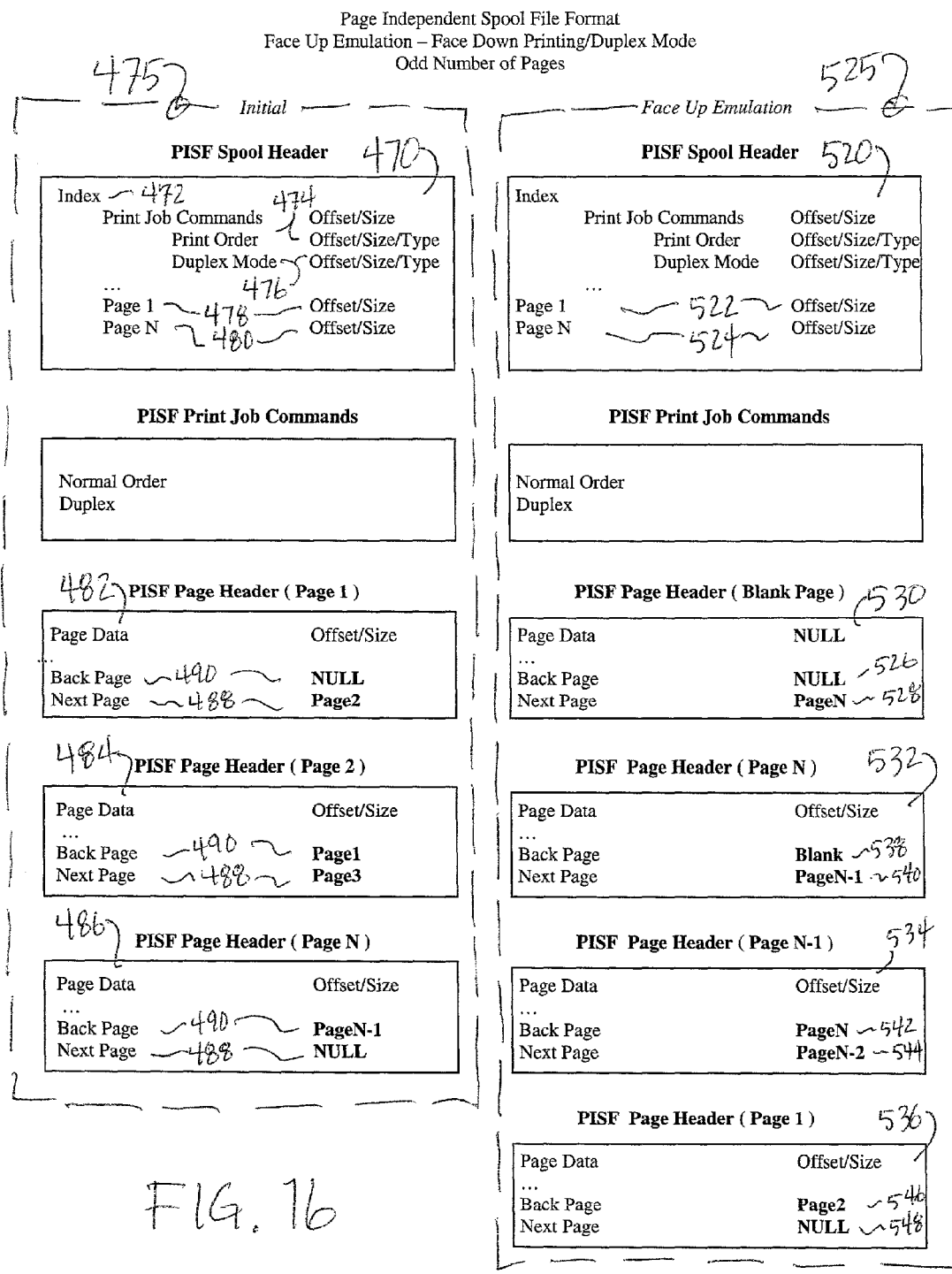
FIG. 16 is a diagram depicting a file format for achieving face-up, collated output from a duplex, face-down print job with an odd number of pages.

When a document contains an odd number of pages, a blank page face may be inserted to correct collation problems caused by page order reversal. An embodiment of this method is illustrated in FIG. 16. The document in the example shown on FIG. 16 has three pages. When printed in duplex mode the last page of the document is printed on the front face of the last page and the back face of the last page is blank. When the printing order is reversed, the final blank page face is moved to the front of the printing order. Accordingly, the blank page face is printed first and a blank page is inserted into the PISF spool file to achieve this end.

As shown in the example in FIG. 16, PISF spool file 525 reflects the page order reversal and the inserted blank page 530. In file 525, the first page record 478 is changed to a blank page 522 and the last page record 480 is changed 524 to document page 1 in the initial document page order. Further, the back page record 526 for blank page 530 is set to null as it is now the first page to be printed. The next page record 528 for this page is set to page N 528 (the last page of the document in the initial page order).

The next page 532 in the modified print order is the final page of the document, page N. This page's back page record is changed to the blank page 538 and its next page record 540 is changed to N-1 or page 2 of the initial document order. The records for the following page to be printed 534 reflect a back page record 542 set to page N and a next page record 544 set to N-2 or, in this example page 1 of the original document in its initial page order. The final page record 536 comprises a back page record 546 set to page N-1 or page 2 in this example and a next page record 548 set to null as this is the last printed page. These formatting changes effectively reverse the printing order and flip the printed pages to the opposite side of each sheet so that the print job arrives face-up in the printer output bin with correct collation.

Below is an example output:

| Original | Face Up Emulation |
|---|---|
| Duplex | Duplex |
| Page 1 | Blank Page (flip paper over) |
| Page 2 | Page N |
| ... | ... |
| Page N | Page 2 |
|  | Page 1 |

For an even number of pages, the $1^{st}$ sheet does not need to be flipped. Below is an example output:

| Original | Face Up Emulation |
|---|---|
| Duplex | Duplex |
| Page 1 | Page N |
| Page 2 | Page N-1 |
| ... | ... |
| Page N | Page 1 |

Note, in EMF mode, none of the data has been rendered yet. Therefore, the rendered data can be passed to the printer in reverse order without rendering all the pages first.

Figure 17:
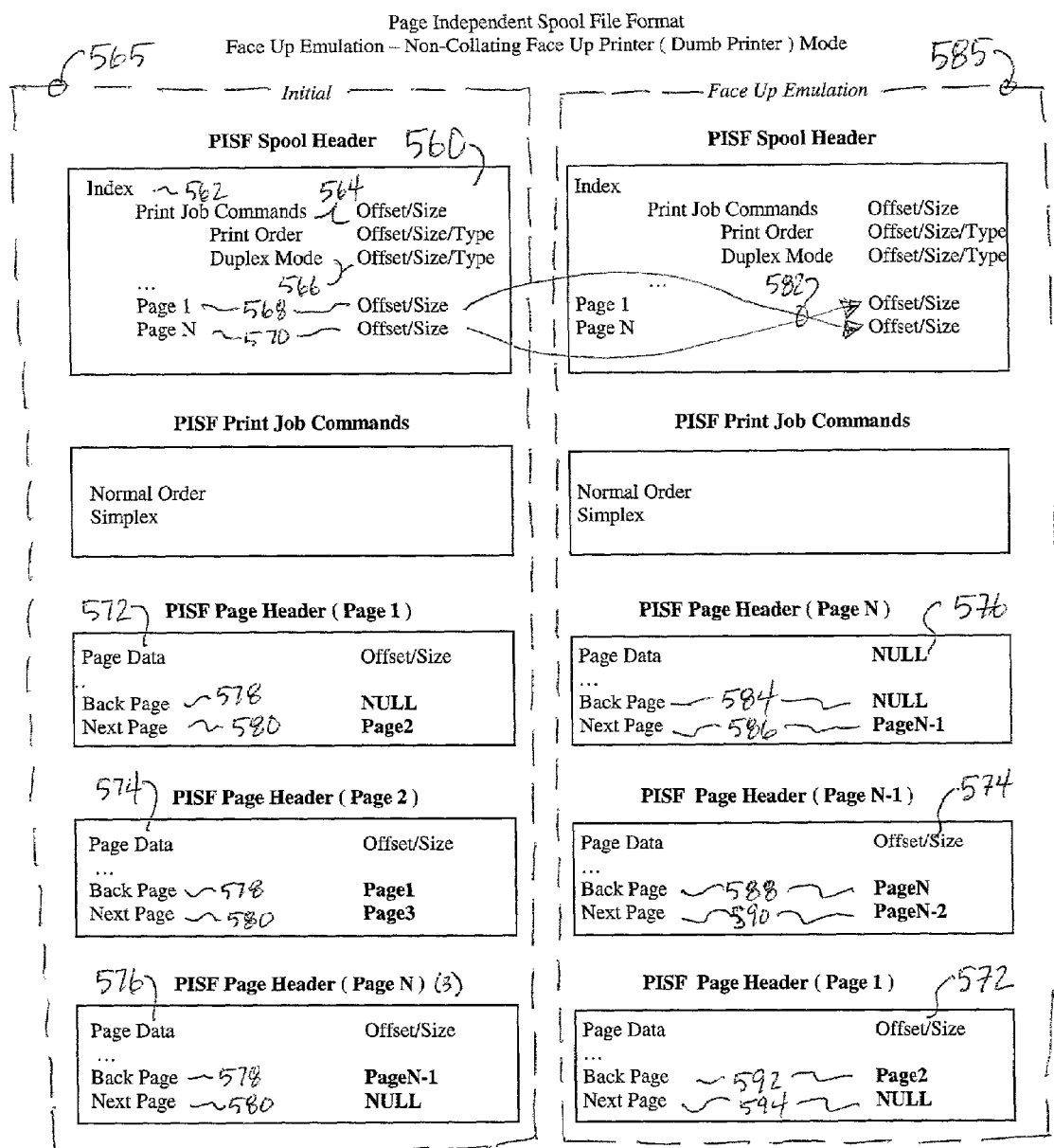
FIG. 17 is a diagram depicting a file format for achieving face-up, collated output from a non-collated, face-up print job.

Embodiments of the present invention may also be used to provide face-up and collation capabilities to so-called "dumb" printers that otherwise have no collation capability. These embodiments may be explained with reference to FIG. 17.

A non-collating face-up printer is a printer that has no hard drive and no other capacity to store print data and has no extra mechanical apparatus (i.e., roller) that enables the printer to flip the printed page upside down before being ejected to the output bin.

The lack of a hard drive requires the printer to print each page as it is received; that is, it cannot store pages and print in another order, such as reverse order. The lack of the extra hardware requires the printer to eject the paper face up, and therefore the output comes out in reverse order (non-collated).

To accomplish this on a non-collating, face-up printer, the PISF Spool Index may be manipulated to reverse the sequential order of pages sent to the printer.

The PISF Spool Header 560 contains an index 562 to locate records within the PISF Spool File 565. The index 562 contains information for locating the Print Job Command record 564, the location, size and data type of the Duplex Mode command index 566 within the Print Job Command record 564, and information for the Page record for the first page 568 and last page 570 in sequential normal order. Each Page record 572, 574 & 576 contains an index to locate the Page record for the previous page (back page) 578 and the next page 580 in sequential normal order.

This may be done by modifying the PISF spool file 565 to reverse the print order. Order reversal is achieved by swapping 582 the first page record 568 and the last page record 570 and by modifying the back page record 578 and next page records 580 in the page record headers 572, 574 & 576 to link the records in reverse order. In the example shown in FIG. 17, initial PISF spool file 565 is modified to form face-up PISF spool file 585. This is done by swapping 582 the first page record 568 and last page record 570. The page record order is also reversed in the file 585 where original order—page 1 (572), page 2 (574) and page 3 (576) in file 565 is reversed to page 3 (576), page 2 (574) and page 1 (572) in file 585.

Within each page record 572, 574 & 576, the back page 578 and next page 580 records are also modified. In the page header 576 of the first page to be printed in the face-up order, page N or page 3 in this example, the back page record 584 is set to null and the next page record 586 is set to page N-1 or page 2 in this example. In the page header for the second page 574 to be printed in the face-up order, the back page record 588 is set to page N or page 3 in this example, and the next page record 590 is set to page N-2 or page 1 in this example. Finally, the page header for the last page 572 to be printed in the face-up order will comprise a back page record 592 set to page 2 and a next page record 594 set to null. These page records effectively link the pages in reverse order thereby providing collated output on a printer that otherwise had no collation capability.

Below is an example output:

| Original | Face Up Emulation |
|---|---|
| Page 1 | Page N |
| Page 2 | ... |
| ... | Page 2 |
| Page N | Page 1 |

Note, in EMF mode, none of the data has been rendered yet. Therefore, the rendered data can be passed to the printer in reverse order without rendering all the pages first.

Some embodiments of the present invention used in conjunction with Windows NT/2000 systems may "fool" the system into processing a print job locally to enable some features of these embodiments. One method in which this may be done is by assigning a network device to a client parallel port, LPT1. This method makes the operating system believe it is printing to a local printer when output is actually redirected to a network device.

Some embodiments of the present invention comprise functionality which operates in conjunction with or as a part of a server's print processor.

Other embodiments of the present invention may be used in conjunction with or as a part of the spooling and despooling subsystems of the Apple MacIntosh Operating System, Linux Operating System, System V Unix Operating Systems, BSD Unix Operating Systems, OSF Unix Operating Systems, and IBM Mainframe MVS Operating System, as well as other operating systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing collated, face-up printing in a duplex printer, said method comprising:

creating a spool data file comprising spool data corresponding to a print job;

from said spool data file, creating a page-independent index file comprising a first plurality of records, wherein each record in said first plurality of records comprises location information and extraction information for an associated portion of said spool data in said spool data file;

manipulating said first plurality of records in said page-independent index file to define a collated, face-up print job, thereby producing a manipulated page-independent index file;

from a print processor, accessing said manipulated page-independent index file to determine portions of said spool data in said spool data file required for said collated, face-up print job;

from said spool data file, extracting said portions of said spool data in said spool data file required for said collated, face-up print job, thereby producing combined spool data for said collated, face-up print job; and converting said combined spool data to printer-ready data.

2. The method of claim 1 wherein said spool data file is a Microsoft Windows Job Description File.

3. The method of claim 1 wherein said manipulation comprises changing the order in which pages are printed.

4. The method of claim 1 wherein said page-independent index file further comprises print job commands, page commands and page data.

5. The method of claim 1 wherein said page-independent index file provides access to at least one Enhanced Metafile (EMF) file.

6. The method of claim 1 wherein said page-independent index file provides access to at least one raw format file.

7. The method of claim 1 wherein said manipulation of said page-independent index file comprises changing the side of a duplex page on which printing occurs.

8. The method of claim 1 wherein said manipulation comprises a page-order pass, a page-scale-and-placement pass, and a sheet-collation pass.

9. The method of claim 1 wherein said manipulation effectuates the printing of a first page in said collated, face-up print job on a first-side of a first sheet of paper when said collated, face-up print job is printed on a duplex printer, wherein a page in said print job coffesponding to said first page in said collated, face-up print job is printed on a second-side of a second sheet of paper when said print job is printed on said duplex printer, wherein said first-side of said first sheet of paper and said second-side of said second sheet of paper coffespond to opposite sides of said first sheet of paper and said second sheet of paper when said first sheet of paper and said second sheet of paper are placed in said duplex printer.

10. A method for providing driver-independent, printer-independent collated, face-up printing in a duplex printing system, said method comprising:

creating a spool data file comprising spool data corresponding to a print job;

from said spooi data file, creating a Page-Independent Spool File (PISF) index file comprising a first plurality of records, wherein each record in said first plurality of records comprises location information and extraction information for an associated portion of said spool data in said spool data file;

allowing manipulation of said first plurality of records in said PISF index file to define a collated, face-up print job, thereby producing a manipulated PISF index file;

from a print processor, accessing said manipulated PISF index file to determine portions of said spool data required for said collated, face-up print job;

from said spool data file, extracting said portions of said spool data in said spool data file required for said collated, face-up print job, thereby producing combined spool data for said collated, face-up print job; and converting said combined spool data to printer-ready data.

11. The method of claim 10 wherein said manipulation comprises a page-order pass, a page-scale-and-placement pass, and a sheet-collation pass.

12. The method of claim 10 wherein said manipulation effectuates the printing of a first page in said collated, face-up print job on a first-side of a first sheet of paper when said collated, face-up print job is printed on a duplex printer, wherein a page in said print job coffesponding to said first page in said collated, face-up print job is printed on a second-side of a second sheet of paper when said print job is printed on said duplex printer, wherein said first-side of said first sheet of paper and said second-side of said second sheet of paper coffespond to opposite sides of said first sheet of paper and said second sheet of paper when said first sheet of paper and said second sheet of paper are placed in said duplex printer.

\* \* \* \* \*